United States Patent
Vatcher et al.

(10) Patent No.: US 10,283,008 B2
(45) Date of Patent: *May 7, 2019

(54) MOTION SIMULATION SYSTEM CONTROLLER AND ASSOCIATED METHODS

(71) Applicant: Dynamic Motion Group GmbH, Vienna (AT)

(72) Inventors: David J. Vatcher, Longwood, FL (US); Simon A. James, Merthyr Tydfil (GB); Andrew J. Cox, Tintinhull Yeovil (GB)

(73) Assignee: Dynamic Motion Group GMBH, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,455

(22) Filed: Dec. 6, 2016

(65) Prior Publication Data

US 2018/0233062 A1     Aug. 16, 2018

Related U.S. Application Data

(63) Continuation of application No. 14/248,097, filed on Apr. 8, 2014, now Pat. No. 9,536,446, which is a
(Continued)

(51) Int. Cl.
*G09B 9/12*     (2006.01)
*A63G 31/16*    (2006.01)

(52) U.S. Cl.
CPC ............... *G09B 9/12* (2013.01); *A63G 31/16* (2013.01)

(58) Field of Classification Search
CPC ........ A63G 31/00; A63G 31/16; F16H 21/00; F16H 21/34; G06F 3/01; G06F 3/048; G05B 19/19; G09B 9/02
(Continued)

(56) References Cited

U.S. PATENT DOCUMENTS 2,229,201 A * 1/1941 Williford ............... A63G 31/00
                                                      187/343
3,304,628 A * 2/1967 Kaplan ..................... G09B 9/14
                                                       434/58
(Continued)

FOREIGN PATENT DOCUMENTS

WO    WO 2011064560    *   6/2011

*Primary Examiner* — Kien T Nguyen
(74) *Attorney, Agent, or Firm* — Christopher M. Ramsey; GrayRobinson, P.A.

(57) ABSTRACT

A motion simulation system includes actuators having a planetary gearbox engaged with and driven by a servomotor engaged with a crank. A connector rod is engaged with the crank of each actuator, and engaged with a platform configured to attach to a vehicle. A control system is operable with each electric servo motor of each actuator for delivering control for providing a simulated motion to the top plate. Control data is sent to the servomotors using a msec data send and receive rate, with internal processing within the nano-second range. Such update rates coupled with a real time, dynamically responsive motion controller results in a desirably smooth and accurate simulator motion. The control system includes a washout filter for transforming input forces and rotational movements. One to six degrees of freedom systems having smooth performance with high payload capability are provided.

2 Claims, 26 Drawing Sheets

Related U.S. Application Data continuation-in-part of application No. 14/094,883, filed on Dec. 3, 2013, now Pat. No. 9,259,657.

(60) Provisional application No. 61/732,534, filed on Dec. 3, 2012.

(58) Field of Classification Search
USPC .......... 472/59–60, 130; 74/25, 74; 715/700, 715/757; 318/560, 605; 434/44, 55
See application file for complete search history.

(56) References Cited

U.S. PATENT DOCUMENTS

| | | | | |
|---|---|---|---|---|
| RE27,051 E * | 2/1971 | Cappel | ............... | B64G 7/00 434/58 |
| 3,559,936 A * | 2/1971 | Guyon | ............... | G09B 9/14 248/179.1 |
| 3,577,659 A * | 5/1971 | Kail | ............... | B25J 17/0216 248/163.1 |
| 3,967,387 A * | 7/1976 | Marchegiani | ............... | G09B 9/14 248/371 |
| 4,343,610 A * | 8/1982 | Chou | ............... | G09B 9/14 434/58 |
| 5,050,086 A * | 9/1991 | Lambregts | ............... | G05D 1/085 244/179 |
| 5,179,525 A * | 1/1993 | Griffis | ............... | B23Q 1/5462 434/55 |
| 5,417,615 A * | 5/1995 | Beard | ............... | A63G 31/00 187/273 |
| 5,431,569 A * | 7/1995 | Simpkins | ............... | G09B 9/02 434/29 |
| 5,584,697 A * | 12/1996 | Trumbull | ............... | A63G 31/16 434/29 |
| 5,656,905 A * | 8/1997 | Tsai | ............... | B23Q 1/5462 318/560 |
| 5,752,008 A * | 5/1998 | Bowling | ............... | G05B 17/02 700/83 |
| 5,752,834 A * | 5/1998 | Ling | ............... | G09B 9/12 434/55 |
| 5,791,903 A * | 8/1998 | Feuer | ............... | G09B 9/14 434/30 |
| 5,827,065 A * | 10/1998 | McClintic | ............... | A63G 31/02 434/29 |
| 5,880,956 A * | 3/1999 | Graf | ............... | B25J 9/1671 318/568.11 |
| 5,964,666 A * | 10/1999 | Uemura | ............... | A63G 31/00 472/2 |
| 6,027,342 A * | 2/2000 | Brown | ............... | G09B 9/14 434/55 |
| 6,431,989 B1 * | 8/2002 | Katayama | ............... | A63G 31/16 434/55 |
| 6,435,995 B1 * | 8/2002 | Salgo | ............... | F16H 7/00 474/148 |
| 6,445,960 B1 * | 9/2002 | Borta | ............... | G09B 9/02 434/30 |
| 6,629,895 B2 * | 10/2003 | Uemura | ............... | A63G 31/16 472/131 |
| 6,634,885 B2 * | 10/2003 | Hodgetts | ............... | G09B 9/12 434/29 |
| 6,733,293 B2 * | 5/2004 | Baker | ............... | G09B 9/08 434/55 |
| 7,484,460 B2 * | 2/2009 | Blum | ............... | A63G 7/00 104/53 |
| 7,806,697 B2 * | 10/2010 | Mallaci | ............... | G09B 9/00 434/29 |
| 7,922,594 B2 * | 4/2011 | Verl | ............... | A63G 21/04 472/131 |
| 7,967,688 B2 * | 6/2011 | Lai | ............... | A63G 31/02 434/58 |
| 8,201,467 B2 * | 6/2012 | Johnson | ............... | F16H 25/20 310/80 |
| 8,395,335 B2 * | 3/2013 | Marchand | ............... | B60L 1/003 318/362 |
| 8,444,496 B2 * | 5/2013 | Lai | ............... | A63G 7/00 472/130 |
| 2001/0029011 A1 * | 10/2001 | Dagani | ............... | F41G 3/2655 434/11 |
| 2002/0116078 A1 * | 8/2002 | Lee | ............... | G05B 17/02 700/31 |
| 2003/0224333 A1 * | 12/2003 | Vastvedt | ............... | G09B 9/02 434/29 |
| 2004/0160415 A1 * | 8/2004 | Rosenberg | ............... | G05G 9/047 345/156 |
| 2004/0181380 A1 * | 9/2004 | Yoshida | ............... | G05B 17/02 703/7 |
| 2007/0134637 A1 * | 6/2007 | Bronstein | ............... | G09B 23/285 434/262 |
| 2007/0218427 A1 * | 9/2007 | Lefton | ............... | A63G 31/16 434/29 |
| 2007/0269771 A1 * | 11/2007 | Lefton | ............... | G09B 9/14 434/29 |
| 2007/0299642 A1 * | 12/2007 | Kondo | ............... | G06F 17/5009 703/6 |
| 2008/0286726 A1 * | 11/2008 | Bennett | ............... | G09B 9/02 434/29 |
| 2009/0163283 A1 * | 6/2009 | Childress | ............... | A63F 13/08 463/47 |
| 2010/0032543 A1 * | 2/2010 | Van Der Tempel | .... | B63B 17/00 248/550 |
| 2010/0070248 A1 * | 3/2010 | Morali | ............... | G09B 9/00 703/2 |
| 2010/0092267 A1 * | 4/2010 | Najdovski | ............... | B25J 13/02 414/7 |
| 2010/0100365 A1 * | 4/2010 | Moriyama | ............... | G06F 17/5009 703/8 |
| 2010/0131865 A1 * | 5/2010 | Ackley | ............... | G06F 3/011 715/757 |
| 2010/0228396 A1 * | 9/2010 | Pechev | ............... | B25J 9/1607 700/263 |
| 2010/0279255 A1 * | 11/2010 | Williams, II | ............... | G09B 9/14 434/29 |
| 2010/0302258 A1 * | 12/2010 | Epps | ............... | G06T 13/40 345/474 |
| 2011/0070564 A2 * | 3/2011 | Van Biervliet | .... | G05B 19/4086 434/55 |
| 2011/0087474 A1 * | 4/2011 | Paulsen | ............... | G05B 17/02 703/7 |
| 2011/0093250 A1 * | 4/2011 | Lin | ............... | G01C 19/38 703/7 |
| 2011/0177873 A1 * | 7/2011 | Sebelia | ............... | A63F 13/803 472/130 |
| 2012/0029703 A1 * | 2/2012 | Veltena | ............... | B25J 9/1615 700/275 |
| 2013/0018374 A1 * | 1/2013 | Edelhauser | ............... | A61B 17/62 606/56 |
| 2013/0045812 A1 * | 2/2013 | Garner | ............... | A63G 19/20 472/97 |

* cited by examiner

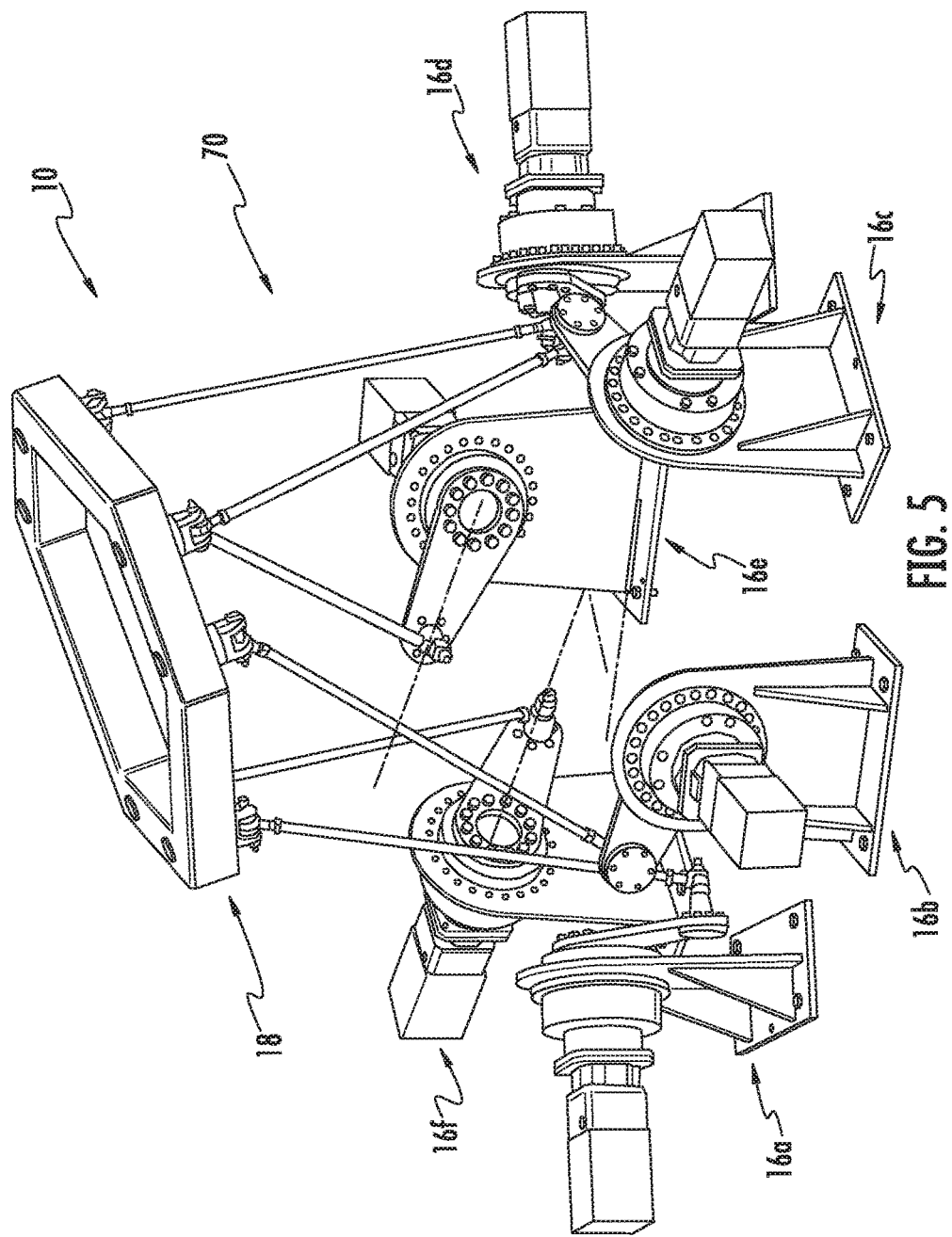

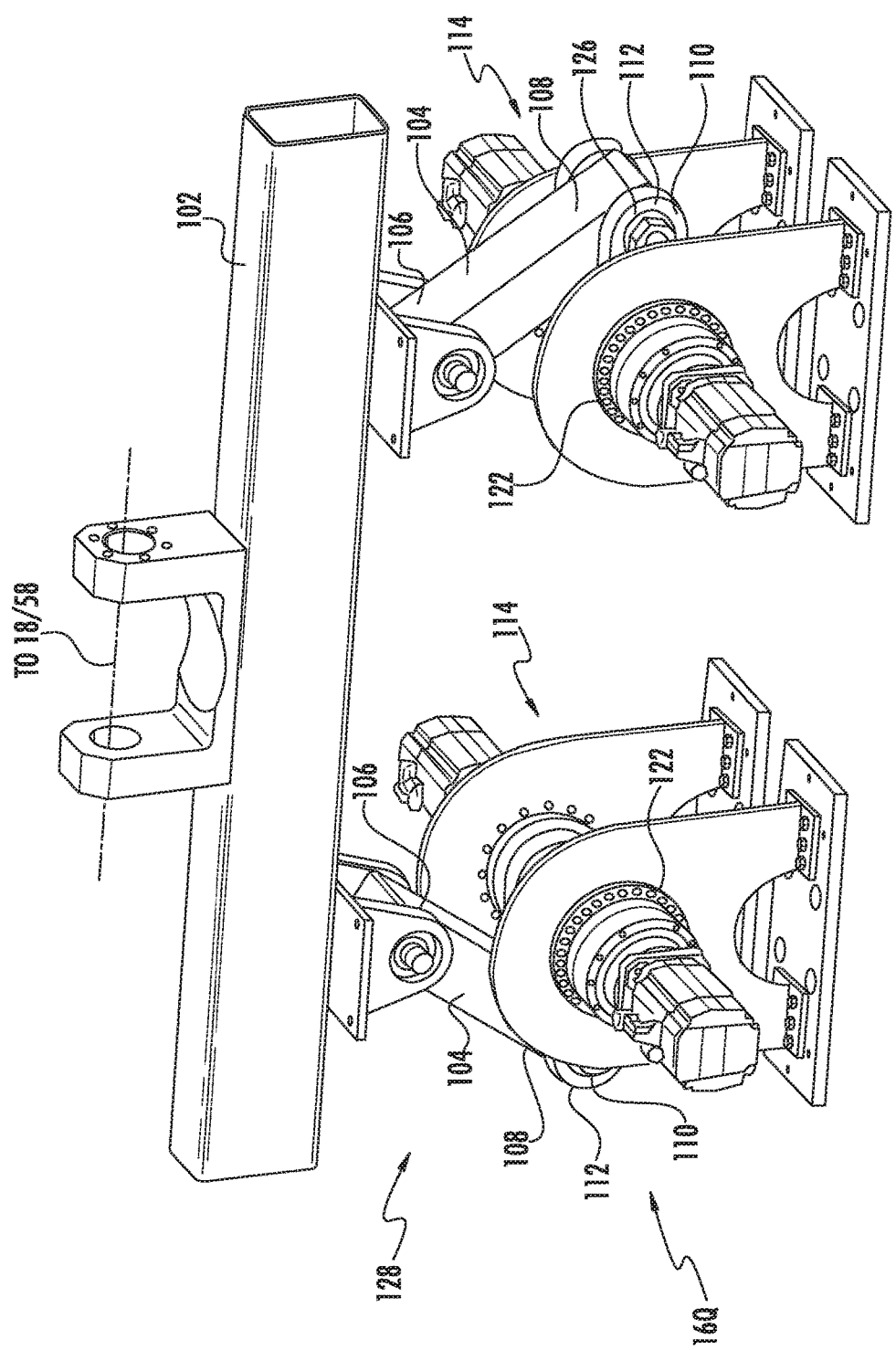

| ACTUATOR (10) | ACTUATOR 1 | ACTUATOR 2 | ACTUATOR 3 | ACTUATOR 4 | ACTUATOR 5 | ACTUATOR 6 |
|---|---|---|---|---|---|---|
| ACTUATOR LOCATION | FRONT LEFT | MIDDLE LEFT | REAR LEFT | REAR RIGHT | MIDDLE RIGHT | FRONT RIGHT |
| ACTUATOR COLOUR | BLUE | RED | MAGENTA | GREEN | YELLOW | CYAN |
| TOP DECK POSITION | | | | | | |
| NEUTRAL | HORIZONTAL | HORIZONTAL | HORIZONTAL | HORIZONTAL | HORIZONTAL | HORIZONTAL |
| HEAVE UP | TDC | TDC | TDC | TDC | TDC | TDC |
| HEAVE DOWN | BDC | BDC | BDC | BDC | BDC | BDC |
| PITCH NOSE UP | +30 | -20 | -30 | -30 | -30 | +30 |
| PITCH NOSE DOWN | -30 | +20 | +30 | +30 | +20 | -30 |
| ROLL LEFT SIDE UP | +27 | +36 | +32 | -15 | -33 | +02 |
| ROLL RIGHT SIDE UP | +02 | -33 | -15 | +32 | +36 | +27 |
| YAW LEFT | -25 | +15 | -25 | +15 | -25 | +15 |
| YAW RIGHT | +25 | -15 | +25 | -15 | +25 | -15 |
| SURGE FORWARD | +32 | -14 | +38 | +38 | -14 | +32 |
| SURGE BACKWARD | +38 | +14 | +32 | +32 | +14 | +38 |
| SWAY LEFT | +37 | +21 | -14 | +29 | +04 | -10 |
| SWAY RIGHT | -10 | +04 | +29 | -14 | +21 | +37 |

FIG. 14

FRONT - UP
RIGHT - DOWN
LEFT - DOWN

FRONT - UP
RIGHT - DOWN
LEFT - UP

FRONT - UP
RIGHT - UP
LEFT - DOWN

FRONT - UP
RIGHT - DOWN
LEFT - DOWN

FRONT - DOWN
RIGHT - DOWN
LEFT - DOWN

FRONT - DOWN
RIGHT - UP
LEFT - UP

FRONT - UP
RIGHT - UP
LEFT - UP

MOTION SIMULATION SYSTEM CONTROLLER AND ASSOCIATED METHODS

CROSS-REFERENCE TO RELATED APPLICATION

This application is a continuation of U.S. Utility application Ser. No. 14/248,097 having a filing date of Apr. 8, 2014, which is a continuation-in-part (CIP) application and claims the benefit of U.S. Utility application Ser. No. 14/094,883 having filing date of Dec. 3, 2013, which itself claims priority to Provisional Patent Application Ser. No. 61/732,534 having filing date of Dec. 3, 2012, the disclosures of which are hereby incorporated by reference in their entirety and all commonly owned.

FIELD OF THE INVENTION

The present invention generally relates to motion simulation and in particular to motion system platforms and controls thereof.

BACKGROUND

Motion simulation systems have included platforms for supporting and initiating physical movement for participants in film exhibitions and amusement attractions as well as simulation products. Such systems have been designed to provide physical movement to participants with film or computer simulation activities.

Motion simulators such those as for amusement attractions and flight simulators include a system that artificially recreates motions such as aircraft flight and various aspects of a flight environment. Typically, these systems include software operated algorithms that govern how a vehicle moves such as in aircraft flight, and how the vehicle reacts to vehicle controls and to external environmental factors such as air density, turbulence, and the like. By way of example, flight simulation is used for a variety of reasons, including flight training for pilots, design and development of the aircraft itself, and research regarding aircraft characteristics and control handling qualities. Further, flight simulations may employ various types of hardware, modeling detail and realism. Systems may include PC laptop-based models of a simple cockpit replica to more complex cockpit simulations, and with wide-field outside-world visual systems, all mounted on six degrees-of-freedom (DOF) motion platforms which move in response to pilot control movements and external aerodynamic factors. Yet further, 6-axis motion systems have been used for simulation in other fields such as driver training and driving research. Simpler systems with less degrees of freedom have been used for a wide variety of applications including flight cabin staff training, medical applications, and maritime training.

Early motion systems typically gave movements in pitch, roll and yaw, and the payload was limited. The use of digital computers for flight simulation typically was limited to specialist high-end computer manufacturers, but with the increasing power of the PC, arrays of high-end PCs are now also used as the primary computing medium in flight simulators.

The early models generally used TV screens in front of the replica cockpit to display an Out-The-Window (OTW) visual scene. Computer-based image generator systems also used TV screens and sometimes projected displays including collimated high end displays for pilot training.

As improvements to motion simulator systems developed with advances in technology, demand increased for full flight simulators (FFS) to duplicate relevant aspects of the aircraft and its environment, including motion. A six degrees-of-freedom (DOF) motion platform using six jacks is a modern standard, and is required for Level D flight simulator standard of civil aviation regulatory authorities such as the Federal Aviation Administration (FAA) in the US and the European Aviation Safety Agency (EASA) Europe. The FAA FFS Level D requirements are the highest level of FFS qualification currently available. The motion platform must have all six degrees of freedom, and the visual system must have an outside-world horizontal field of view of at least 150 degrees, with a collimated distant focus display and with a transport delay to conform to the FAA FFS Level D requirements. Realistic sounds in the cockpit are required, as well as a number of special motion and visual effects.

In order for a user to feel that a motion simulator is accurate, the simulator has to behave in a way that feels realistic and predictable. By way of example, if a pilot gently guides a simulated aircraft into a turn, the motion simulator shouldn't tilt at a sharp angle, which would represent a much tighter turn. Data gathered from computer models, field tests and complex algorithms are typically used to program simulator behavior. Force-feedback greatly affects the user's experience, making it seem more real and consequently a more effective training environment.

Cam driven motion systems have been used in products for the amusement and for low-end simulation in the simulation industries. Cam driven systems have been provided with a variety of geometries and axis arrangements, including 3-axis systems and 6-axis systems, such as used by E2M Technologies in the Netherlands.

Some of these systems have used induction motors controlled by variable speed drives (VSDs) using analogue control signals from a motion controller based on a PID loop. A Proportional, Integral, Derivative (PID) loop is typically used by controllers to eliminate the need for continuous operator attention. These induction motor systems experience problems with motion lag caused by slip between the field and the rotor which results in a large error between the commanded and actual position. Further, servo motor controlled systems known in the industry have also not met the requirements for Level D. Such position errors are increasingly problematic as motion systems in simulators and amusement attractions utilize higher speed computer rendering and graphics as users can sense and experience this lag, slow response time and an out-of-sync experience.

Systems have sought to achieve multi-axis motions systems such as the Stewart platform which used a 3 to 3 and 3 to 6 configuration which was difficult to produce due to the complexity of the co-joined bearings.

Known induction motor and servo motor systems also have limitations in the control of the position of the system in relation to an activity of the user such as simulation activity like flying or viewing a film or visual depiction in a simulator. These systems also experience problems induced by activities such as high frequency vibrations that affect the life and performance of the motors. Payloads have also been limited by these designs due to the power-to-size ratios of both induction motors and servo motors with currently known control systems.

There remains a need for an improved motion simulation system with improved control of the motion and synchronization between the physical motion and response time to provide a smooth motion and realistic motion experience.

There is further a need for such simulation systems to be capable of supporting a high payload while maintaining the smooth and realistic motion experience. There is also a need for a motion system that can be easily reconfigured and adjusted for varying operating scenarios or applications.

SUMMARY

An aspect of the present invention includes a motion simulation system comprising a platform, at least one connector rod having opposing proximal and distal ends thereon, wherein the distal end of the at least one connector rod is rotatably connected to the platform, and at least one actuator. The actuator may comprise a motor/gearbox assembly having a servomotor operable with a planetary gearbox and shaft driven thereby, a crank arm having a proximal end fixedly attached to the shaft for rotation thereby, and a distal end rotatably connected to the proximal end of the connector rod. Yet further, the actuator may include a base and a support having a proximal end affixed to the base and an opposing distal end affixed to the motor/gearbox assembly for fixedly attaching the motor/gearbox assembly in spaced relation to the base or foot for permitting the crank arm to make rotations about an axis of the shaft. Generally for one, two and three degree of freedom systems, full 360 degree rotations are employed, and may be made available for six degree of freedom systems. A controller may be operable with the actuator for providing an electric signal to each of the servomotors for providing a preselected motion to the at least one connector rod and thus the platform, wherein the control system directs input forces and rotational movements into positions of the platform.

One motion simulation system may comprise a foundation or base, at least one or a plurality of actuators connected to the foundation and at least one top plate movably connected with the actuators and configured to connect a platform assembly. Each of the actuators may comprise a support plate configured to connect with the foundation and having an aperture that receives a planetary gearbox. The gearbox is engaged with and driven by at least one electric servo motor and connected to a drive shaft. The motor and gearbox and shaft can be provided as a single unit referred to as a motor/gearbox assembly. The drive shaft is engaged with at least one main crank. A main crank is movably connected with a connector rod by bearings at a first proximal end of the connector rod. At the distal end of the connector rod, bearings are attached and connected with a top plate. A top plate may be configured to attach to the platform assembly to drive the platform assembly in use.

The motion simulation system may include a control system for controlling movement of an actuator for recreating acceleration, reducing the acceleration to zero while sending the system to a neutral position below a level of perception of a user of the simulation system, by way of example. The control system for professional training desirably includes a washout filter module used to transform input accelerations of a vehicle into positions and rotations of the motion platform so that the same forces can be reproduced using a limited motion envelope of the motion platform. This washout filter is an implementation of a classical washout filter algorithm with improvements including a forward speed based input signal shaping, extra injected position and rotation, extra injected cabin roll/pitch, and rotation center offset from the motion platform center when in the neutral position. The washout filter has two main streams including high frequency accelerations (short term and washed out), and low frequency accelerations which are sustained (herein termed a gravity vector).

The control system sends signals to the electric motor to drive the actuator to and through its desired positions. For example, the control system sends signals to vary the speed of the electric motors and to move the actuator elements into a desired position by moving the crank through a path of rotation and the connector rod through one or more paths in and across multiple axis of rotation.

The motion system may utilize a single axis, or multi-axis systems including by way of example, one, two, three and six axes. The motion system components can be varied to provide these different configurations or to provide different application with the same axis structure. For example, the number, size and positioning of components may be varied by varying the number of crank arms and connector rods and planes which they rotate and work. Electric servo motors and planetary gear boxes may be provided according to the number of axes, or some multiple of the number of axes. For example, the system may be provided with two motors and two gearboxes per actuator or four motors and four gearboxes per actuator, and yet further, six motors and six gearboxes, as desired to meet performance and payload requirements, by way of example. Support plates may be provided with one per actuator while main cranks can be provided with one per actuator or two per actuator in configurations, where four motors and four gearboxes drive one actuator. Connector rods typically are provided one per actuator with two spherical bearings per actuator, one bearing at each end of the connector rod or arm member.

Configurations herein described by way of example include 3-axis and 6-axis motion systems. By way of example, in one 6-axis configuration, the motor/gearbox/driveshaft and crank arm may be placed at 90° angles. The crank arms and connector rods, by way of example, may use spherical bearings and do not work in the same plane of motion. This provides six degrees of freedom by rotation in three directions and combinations of all rotations and translations. In a two axis system, the motor/gearbox/driveshaft and crank arm may be positioned along a common line such that the crank arm and connecting rod operate in same plane. This provides two degrees of freedom, a single rotation and single translation degree. With appropriate guides, such a system can also provide a single degree of freedom, typically with translation in a heave motion.

In one embodiment of a 6-axis system, six actuators are equally spaced 60° apart on a nominal circular base plate. The actuators are connected to a top plate (platform portions) in a similar arrangement. There are six attachments at the top which ease the construction of the system. The actuators move in synchronization to create motion in six directions as follows: Pitch (rotation about a transverse axis parallel to the top plate normally notated as the y axis in local coordinates); Roll (rotation about a longitudinal axis parallel to the top plate normally notated as the x-axis in local coordinates; Yaw (rotation about a vertical axis which intersects the x and y axes at their intersection and normally notated as the z-axis in local coordinates); Surge (translation along the x-axis); Sway (translation along the y-axis); Heave (translation along the z-axis); and combinations thereof.

Advantages and benefits of the systems and methods according to the teachings of the present invention include, but are not limited to hardware improvements, configuration flexibility, controls hardware and software, profile generating software tool, special effects library, event synchronization, motor synchronization, embedded motion profile playback, and a regenerative power system.

BRIEF DESCRIPTION OF DRAWINGS

Embodiments of the invention are described by way of example with reference to the accompanying drawings in which:

FIG. 5 is a perspective view of the Six Degree of Freedom system in a pitch movement;

FIG. 12 is a perspective view of a quad motor/gearbox actuator useful in a 3-axis motion system;

FIGS. 12A and 12B are perspective views of the quad motor/gearbox actuator of FIG. 12 in fully up and fully down positions, respectively;

FIG. 14 is a table of actuator positions at their excursion limits for the Six Degree of Freedom system embodiment of FIG. 1, wherein various actuator positions are illustrated with reference to FIGS. 3-9, by way of non-limiting example;

DETAILED DESCRIPTION OF EMBODIMENTS

Figure 1:
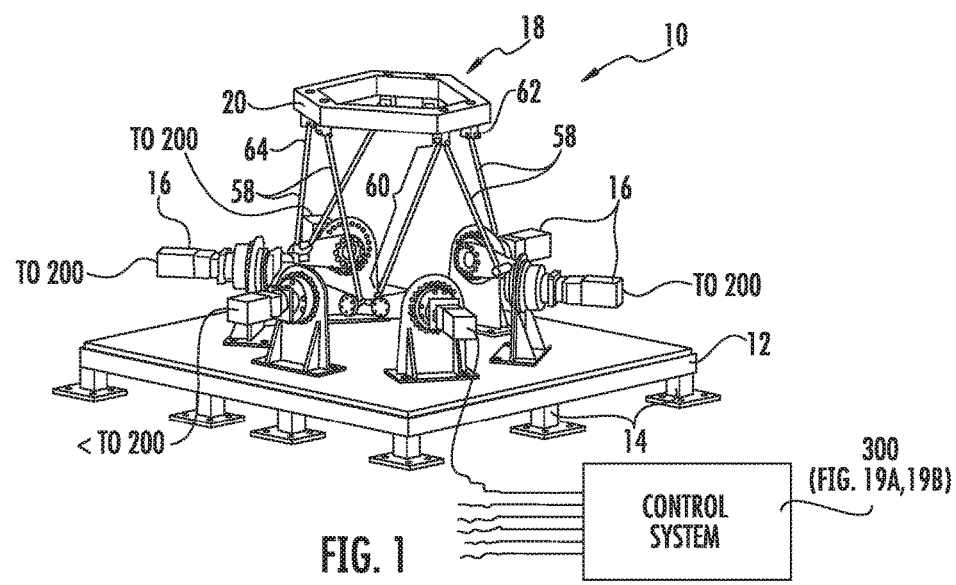
FIG. 1 is a perspective view of a Six Degree of Freedom, 6-axis motion system, according to the teachings of the present invention.

The present invention will now be described more fully hereinafter with reference to the accompanying drawings, in which embodiments of the invention are shown by way of illustration and example. This invention may, however, be embodied in many forms and should not be construed as limited to the embodiments set forth herein. Rather, these embodiments are provided so that this disclosure will be thorough and complete, and will fully convey the scope of the invention to those skilled in the art. Like numerals refer to like elements.

In one embodiment of a motion simulation system according to the teachings of the present invention, and as illustrated with reference initially to FIG. 1, a motion system 10 is shown as a 6-axis motion system. As noted, the motion system 10 can be provided with a variety of axis combinations from one to six axis systems, by way of example. The motion system 10 comprises a foundation in the form of a system base 12 with raised feet 14. The system base 12 can take a variety of configurations to supply the particular application of the system 10. The motion system 10 also includes a plurality of actuators 16, herein identified as 16a, 16b, 16c, 16d, 16e and 16f, with each actuator 16 mounted on the system base 12 spaced apart generally in a hexagonal arrangement by way of non-limiting example. Each actuator 16 (herein a single motor/gearbox actuator assembly) is connected to a section of a platform 18. By way of example, the platform 18, as herein described by way of non-limiting example, is formed with six individual sections of 20 A-F to illustrate a standalone structure. However, the system 10 may be connected to a selected simulator using three of the sections including 20A, 20C and 20E, each of which has upper portions of the connector rods 58 pivotally attached using upper bearings 62. The platform 18, or sections thereof, is configured to be connected to the system base 12 for a particular application of an embodiment the motion system 10 for a flight simulator or an amusement ride, by way of example.

Figure 2:
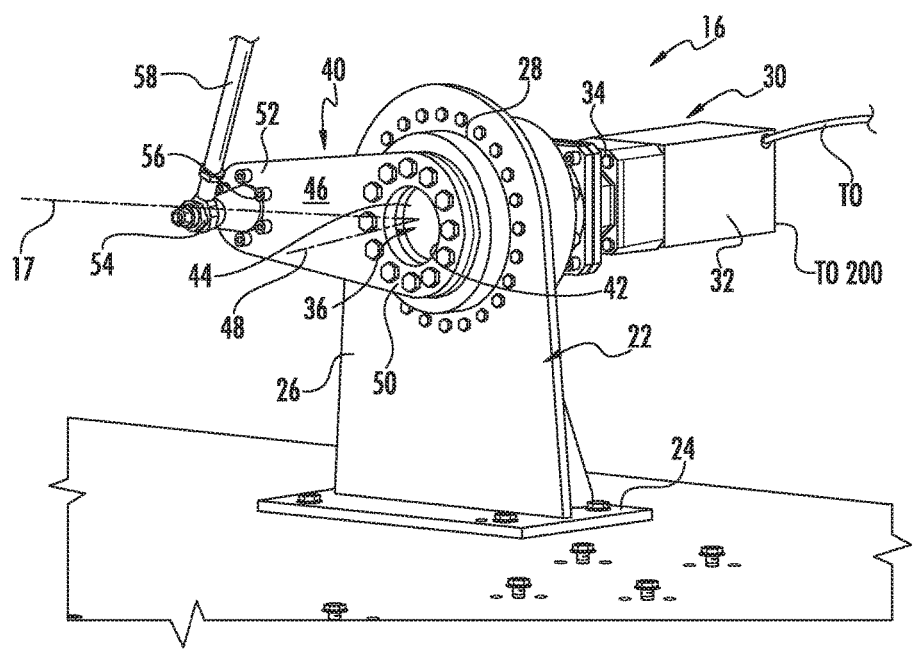
FIG. 2 is a perspective view of an actuator used with the Six Degree of Freedom, 6-axis motion system of FIG. 1.

Each of the actuators 16 (16a, 16b, 16c, 16d, 16e and 16f) is comprised of components described in relation to the actuator 16 having the single motor/gearbox assembly in FIG. 2, by way of example. The actuator 16 includes a main actuator support 22 having a base or foot 24 connected to the system base 12 and a vertical stand 26 rising from the foot 24 and having an aperture 28 in an upper portion of the vertical stand configured to receive a motor/gearbox assembly 30. The motor/gearbox assembly 30 includes an electric servomotor 32 connected to a planetary gearbox 34 which motor/gearbox assembly 30 is engaged with a drive shaft 36 at a proximal end thereof which is driven by the motor 32. The motor 32, the gearbox 34 and the drive shaft 36 is therein provided as a single unit referred to the "motor/gearbox assembly" 30 but can be provided as separate components without departing from the teachings of the present invention.

The motor 32 is an electrical servo motor that is controlled by a control system as will later be described.

With continued reference to FIGS. 1 and 2, the motor/gearbox assembly 30 is connected to a main crank 40 having an aperture 42 surrounding a distal end 44 of the drive shaft 36. The crank 40 is a rigid, elongated member having a face 46 connected perpendicularly to the plane of a longitudinal axis 48 of the drive shaft 36 at a proximal end portion 50. A distal end 52 of the crank 40 receives a lower spherical bearing 54 connected through a second aperture 56 in the crank. The lower spherical bearing 54 connects the crank to a connector rod 58. The lower spherical bearing 54 is selected to allow rotational movement of the connector rod 58.

Figure 1A:
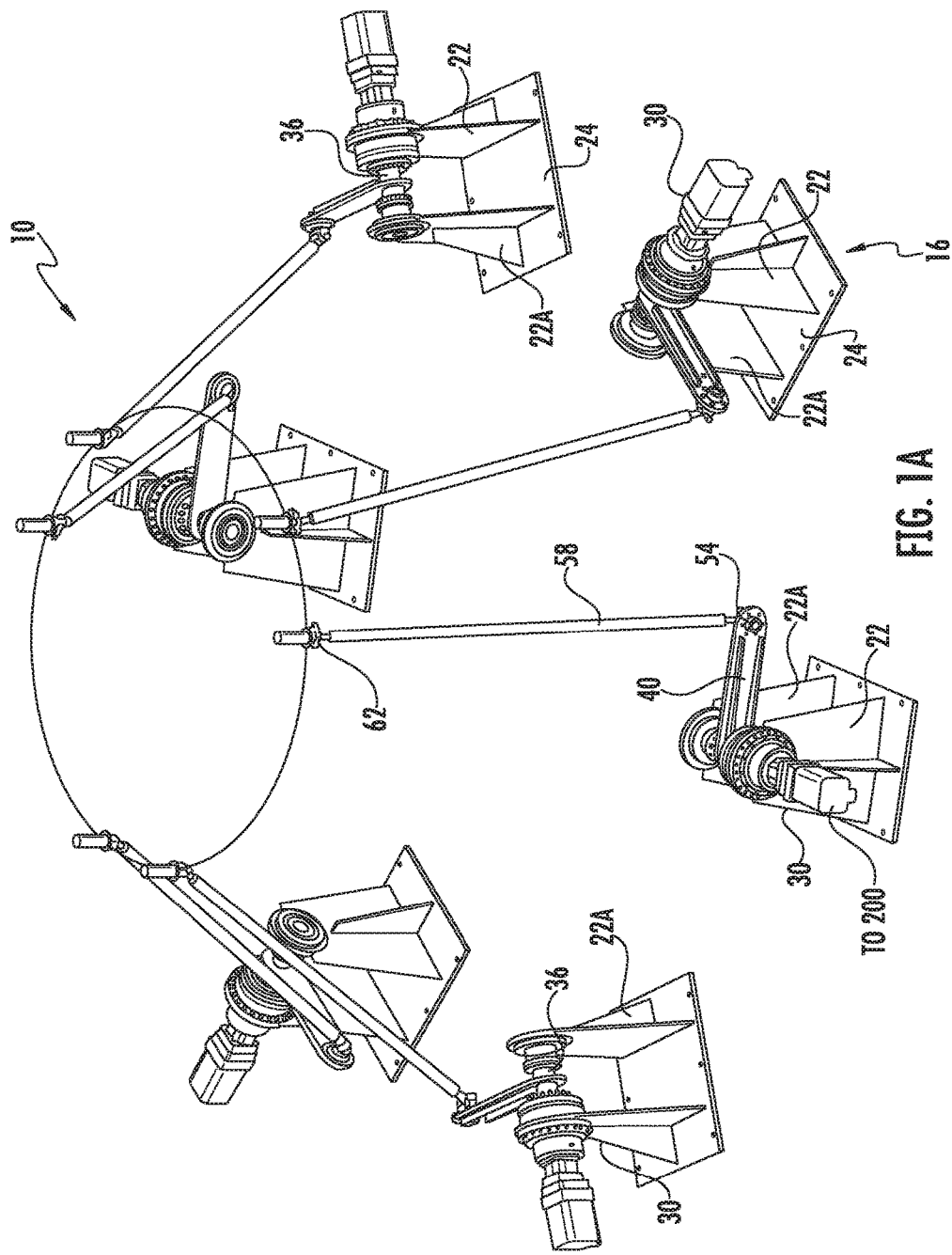
FIG. 1A is a perspective view of an alternate embodiment of the system of FIG. 1 employing single motor actuators with alternate supporting shaft member.

As illustrated with reference to FIG. 1A, and within the teachings of the present invention, the system 10 may include actuators 16 employing the single motor/gearbox assembly 30, but having the distal end of its shaft 36 rotatable supported by a second support 22A.

Figure 3:
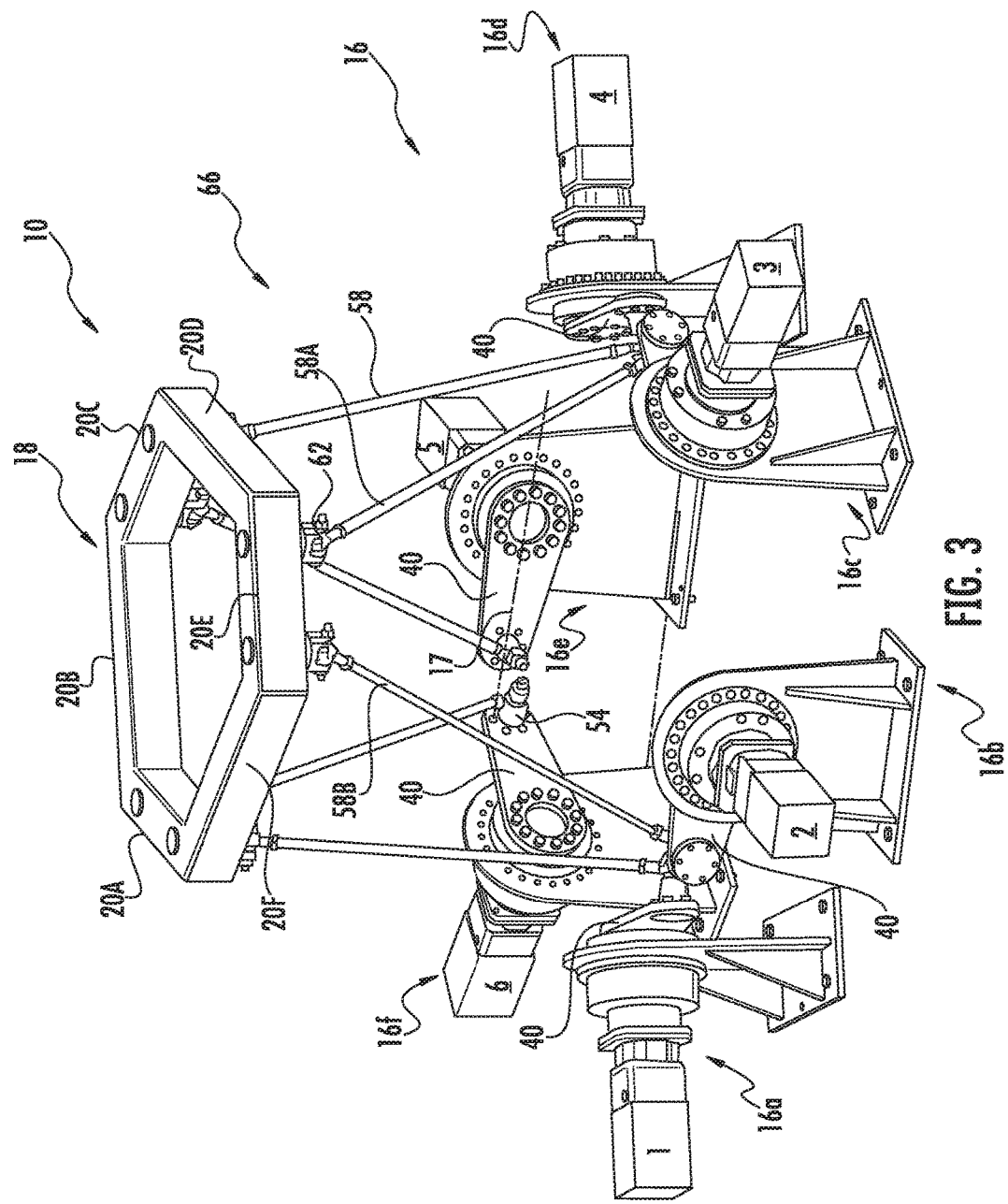
FIG. 3 is a perspective view of the Six Degree Freedom system in a neutral position.

The connector rod 58 has an elongated form in a predetermined length 60 determined to provide a desired motion for the application of interest. The connector rod 58 is connected to an upper spherical bearing 62 positioned at a distal end 64 of the connector rod 58 opposite the crank 40. The upper spherical bearing 62 connects the connector rod 58 to the platform 18 such that the connector rod 58 can move through a range of orientations with respect to the platform and the crank 40. Each actuator 16a, 16b, 16c, 16d, 16e and 16f is of similar construction. The connector rods 58A-58F are connected to the platform 18 in pairs of adjacent connector rods, such as 58A, 58B connected at ends of a section 20 as illustrated with reference again to FIG. 3. This arrangement allows for movement in the six degrees of freedom. The platform 18 or platform section thereof 20A, 20C, 20E are configured to attach to a desired assembly, whose movement is to be driven by the system 10.

The connector rods 58A-58F and cranks 40A-F are arranged to allow the cranks to rotate and allow the connector rods to travel through a desired plane of motion. As each connector rod 58 travels through its path, the platform 18 is moved to a range of orientations as illustrated by way of example with reference again to FIG. 3 and now FIGS. 3-9 for neutral, heave, pitch, roll, surge, sway and yaw as well-known and desired movements illustrated with reference to FIG. 10. With six connector rod/crank combinations attached to the top platform, the platform can range through the six degrees of freedom motion.

The motion system 10 can utilize a single axis, or multi-axis systems including by way of example only, one, two, three and six axes. The motion system 10 components can be varied to provide such different configurations. For example, the number, size and positioning of components can be varied such as varying the number of cranks 40, connector rods 58 and platform sections 20. The electric motors 32 and planetary gear boxes 34 can be provided according to the number of axes, or some multiple of the number of axes. By way of example, the system 10 can be provided with two motors 32 and two gearboxes 34 per actuator 16 or even up to four motors 32 and four gearboxes 34 per actuator 16. As illustrated with reference to FIGS. 11 and 12, respectfully. By way of example and as illustrated with reference to FIG. 11, the embodiment herein described includes the actuator 16 including a dual motor/gearbox assembly operable with one crank 40 (herein referred to as 16D). Yet further, an actuator, according to the teachings of the present invention, may include a four or quad motor/gearbox assembly as illustrated with reference to FIG. 12 as actuator 16Q. Such an actuator 16Q is useful with a 3 DOF motion system 100, illustrated with reference to FIG. 13. With continued reference to FIG. 12, the actuator 16Q includes a beam 102 to which arm members 104 are pivotally connected at their distal ends 106 to the beam 102 and at their proximal ends 108 to cranks 110 at distal ends 112 thereof. With reference again to FIG. 13, two cranks 110 are paired to be connected to the arm member 104. Yet further, two dual motor/gearbox assemblies 114 are themselves paired to form the quad actuator 16Q. Thus, four motors and four gearboxes drive the single quad actuator 16Q.

With reference again to FIG. 1, in a 6-axis configuration, the motor/gearbox/drive shaft and crank arm are placed at 90° angles. The crank arms and connecting rods use spherical bearings and do not necessarily work in the same plane of motion. This provides six degrees of freedom by rotation in three directions and combinations and translation in three directions. One connecting rod 58 is provided per actuator 16 with two spherical bearings 54, 62 per rod 16, one bearing at each end of the connecting rod as above disclosed.

By way of contrast, in a two axis system, the motor/gearbox/drive shaft and crank arm are positioned along a common line such that the crank arm and connecting rod operate in a same plane. By way of example, this provides 2 degrees of freedom, a single rotation and single translation degree. With appropriate constraints in controls and/or structure, such a configuration can also be used for a one degree of freedom system.

Figure 10:
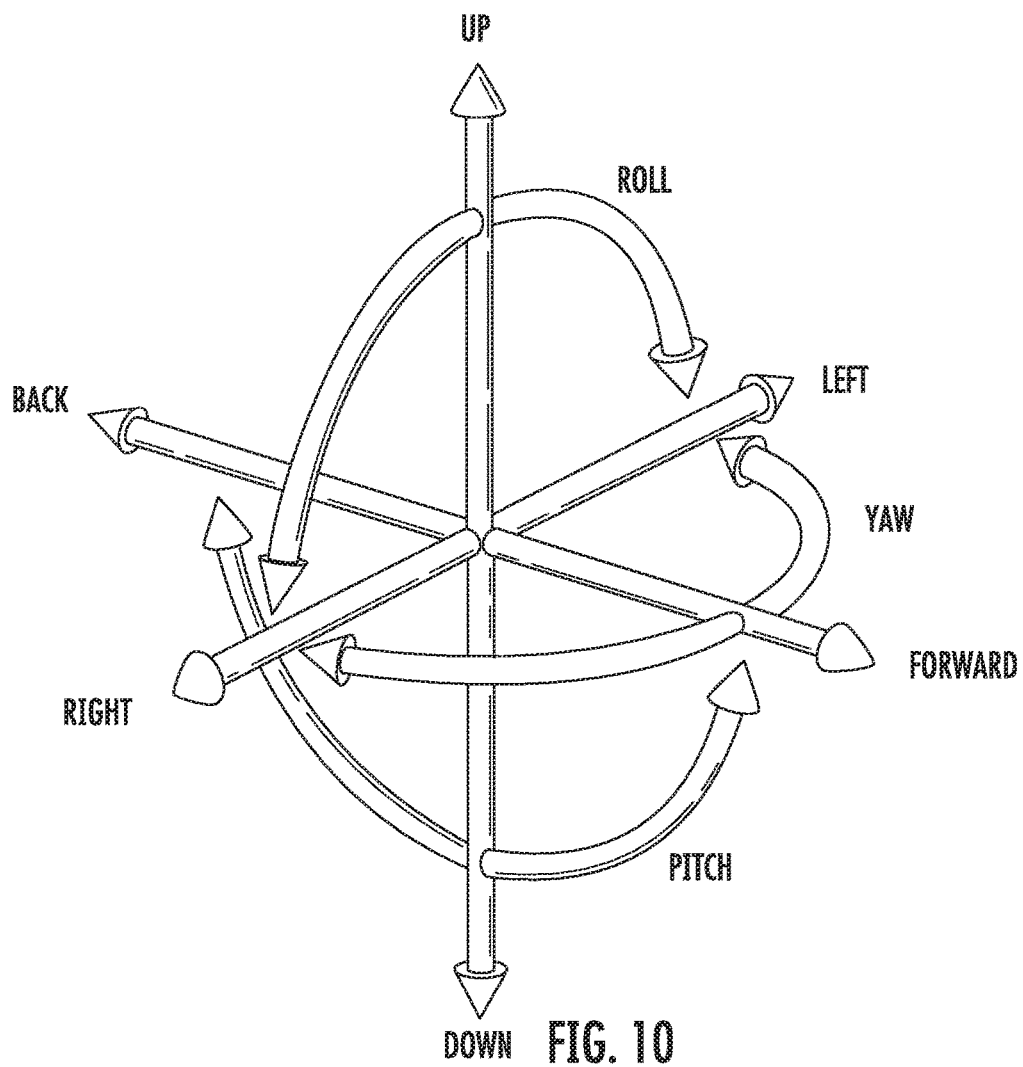
FIG. 10 is a diagrammatical illustration of movements in the Six Degree of Freedom system about three axes.

In the embodiment of the Six Degree of Freedom System 10, as illustrated with reference again to FIGS. 1 and 11, each actuator 16, 16D is put in position to enact the desired movement such as neutral, roll, pitch, yaw, surge, sway, heave or a combination thereof, as above described with reference to FIG. 10. The system comprises 6 actuators equally spaced at 60° apart on the base or system base 12. The actuators 16 are connected to the platform 18 in a similar arrangement to the typical Stewart system configurations. As a result, there are six attachments at the top which eases the construction of the system. The actuators 16 move in perfect synchronization to create motion in 6 axes as earlier described. With Pitch (rotation about a transverse axis parallel to the top plate normally notated as the y axis in local coordinates); Roll (rotation about a longitudinal axis parallel to the top plate normally notated as the x-axis in local coordinates; Yaw (rotation about a vertical axis which intersects the x and y axes at their intersection and normally notated as the z-axis in local coordinates); Surge (translation along the x-axis); Sway (translation along the y-axis); Heave (translation along the z-axis); and combinations of all the above motions.

The movements of this exemplary 6-axis system 10 in actuator positions and at their excursion limits are further described in the exemplary Table of FIG. 14. The rotational positions of the actuators 16 are denoted with rotation above a horizontal plane 17, illustrated in FIG. 3 by way of example. Sample movements are shown with each actuator 16a, 16b, 16c, 6d, 16e and 16f. As above described, the system 10 is shown at neutral position 66 in FIG. 3. The cranks 40 in the neutral position are all aligned generally parallel horizontal plane to the system base 12. The connector rods 58 are angularly disposed from the crank 40 up to the connection at the platform 18.

Figure 4:
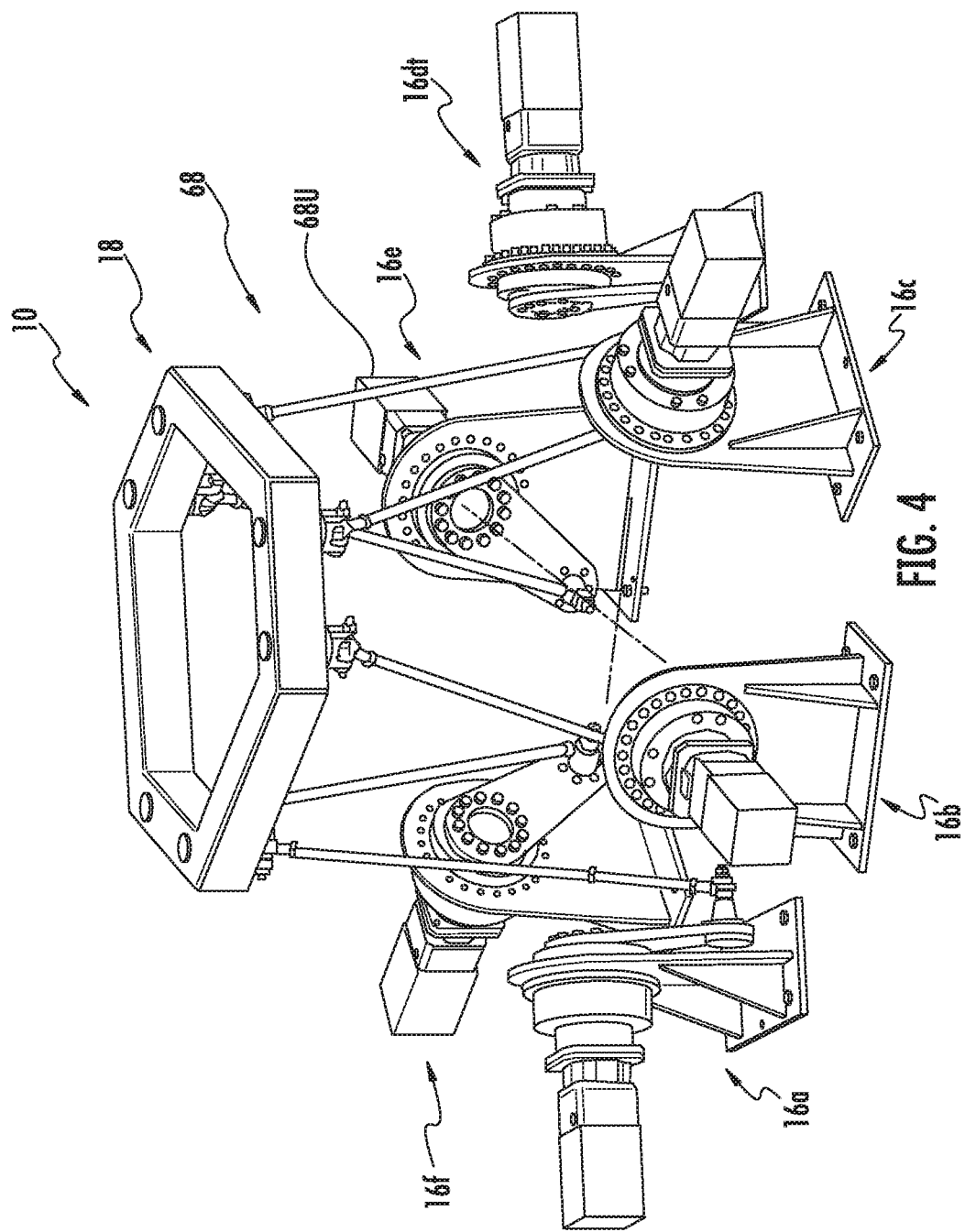
FIGS. 4 and 4A are perspective views of the Six Degree of Freedom system in heave down and heave up moments, respectively.

The system 10 is shown at a heave movement position 68, in a heave downward system toward base 12 in FIG. 4. As illustrated with reference to FIGS. 3 and 4, the cranks 40 are all in a 45 degree angle below the horizontal plane 17 of the base or system base 12, by way of non-limiting example. The cranks 40 are positioned in alternating angled position with respect to the neighboring actuator 16. The connector rods 58 are disposed from the crank 40 up to the connection at the platform 18. The example herein presented in illustrating a 45 degree angle by way of example. The connector rods can move through ±90 degrees when the connector rods are not at 90 degrees to the crank. Typically, the useful extent of the crank motion is in a region of ±60 degrees because as the cranks approach ±90 degrees, the rate of heave motion reduces significantly.

Figure 4A:
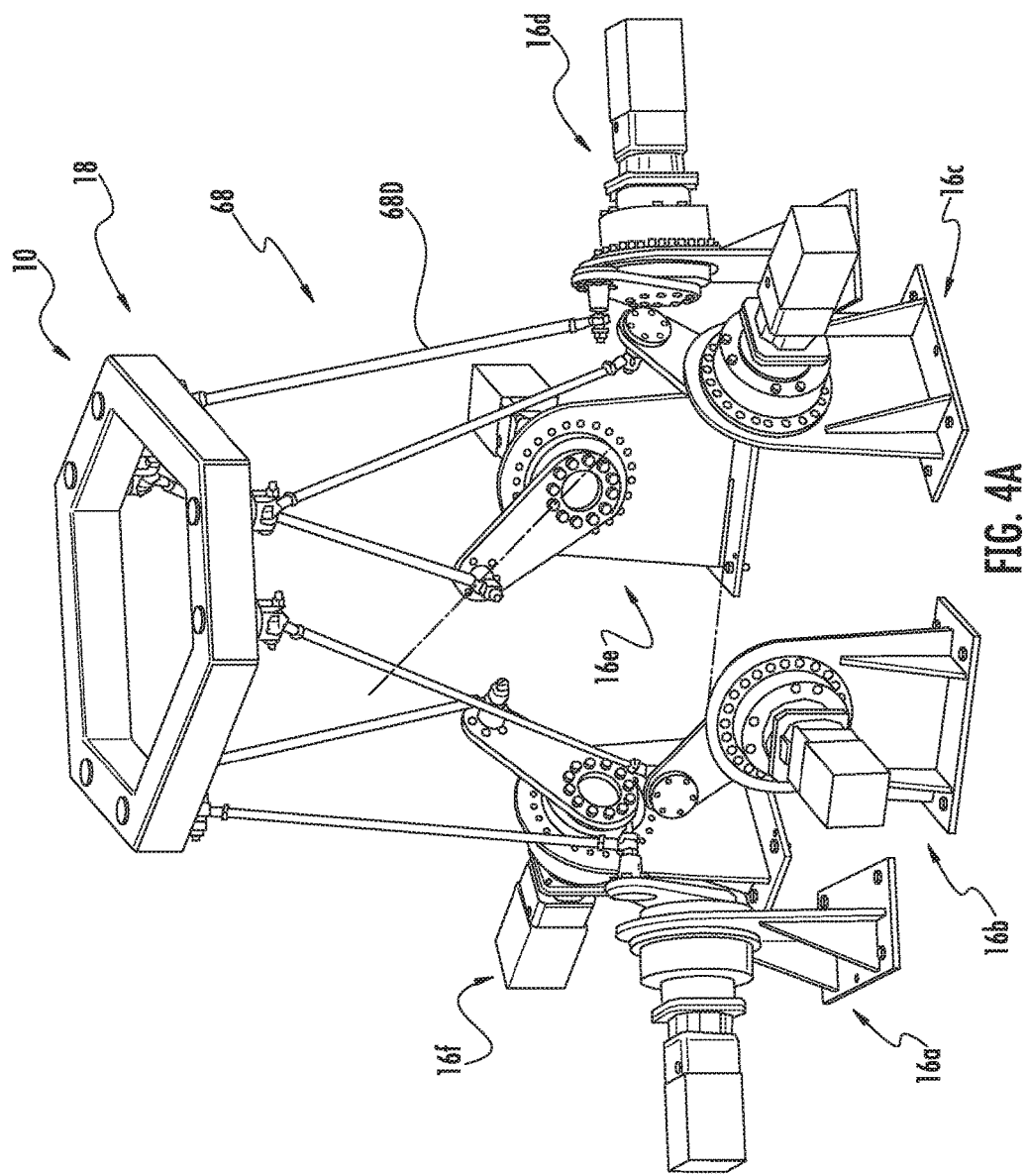

The system 10 is shown in a heave movement position 68, a heave upward position from the system base 12 in FIG. 4A. As shown in FIG. 4A, the cranks 40 are all in a 45 degree angle above the horizontal plane 17 of the system base 12, wherein the horizontal plane is herein designated a neutral position for the cranks, by way of non-limiting example. The cranks 40 are positioned in alternating angled position with respect to the neighboring actuator 16. The connector rods 58 are disposed from the crank 40 up to the connection at the platform 18.

The system 10 is shown in a pitch movement position 70 in FIG. 5. Wherein the cranks 40 have varying positions and angles above and below the horizontal plane of the actuators 16 and parallel to a plane of the system base 12, typically a horizontal plane, as illustrated and further described in Table of FIG. 14.

Figure 6:
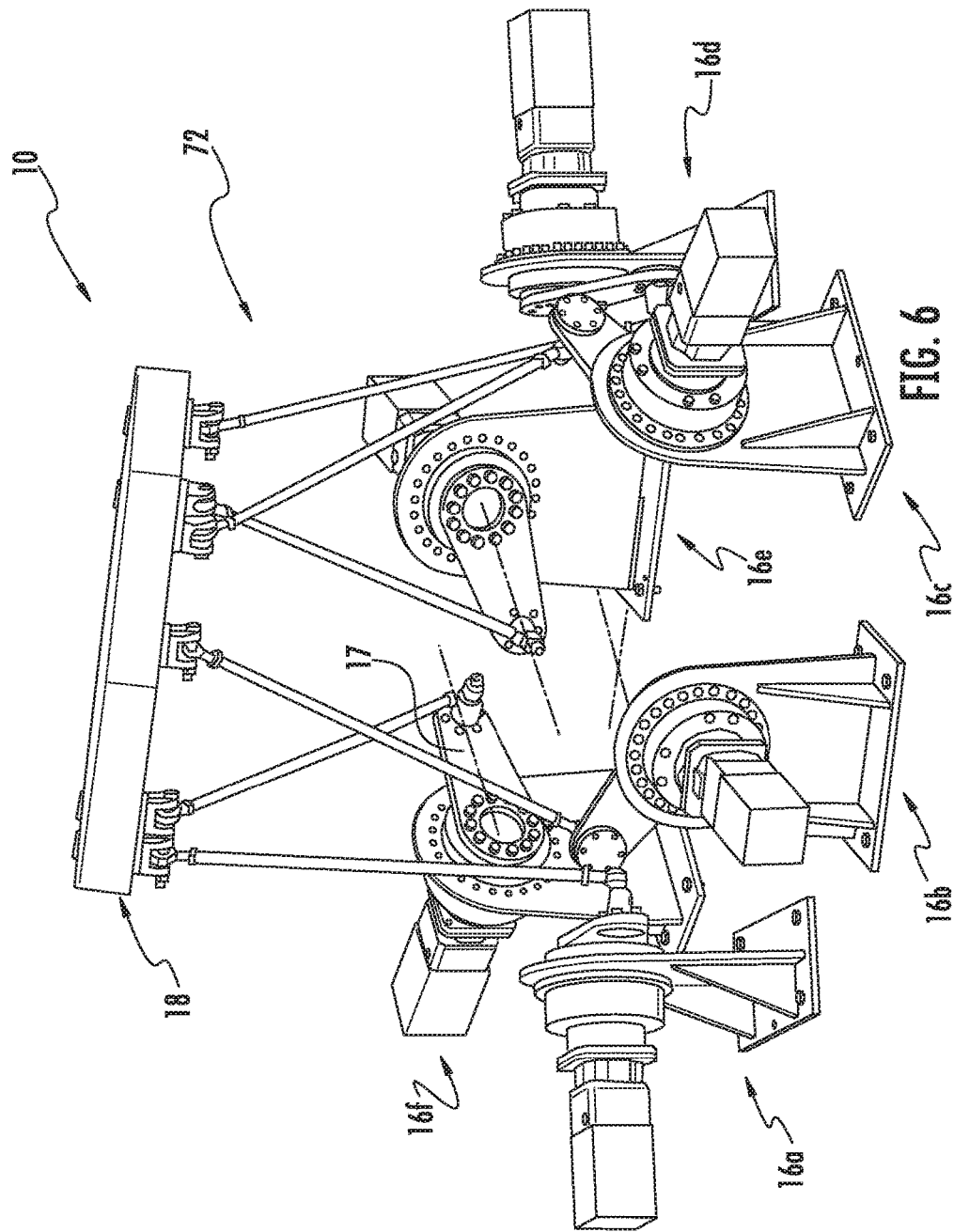
FIG. 6 is a perspective view of the Six Degree of Freedom system in a roll movement.

The system is shown in a roll movement position 72 in FIG. 6. Wherein, the cranks 40 are in varying positions and angles above and below the horizontal plane of the actuators 16 and parallel to the system base 12 as shown in the table of FIG. 14.

Figure 7:
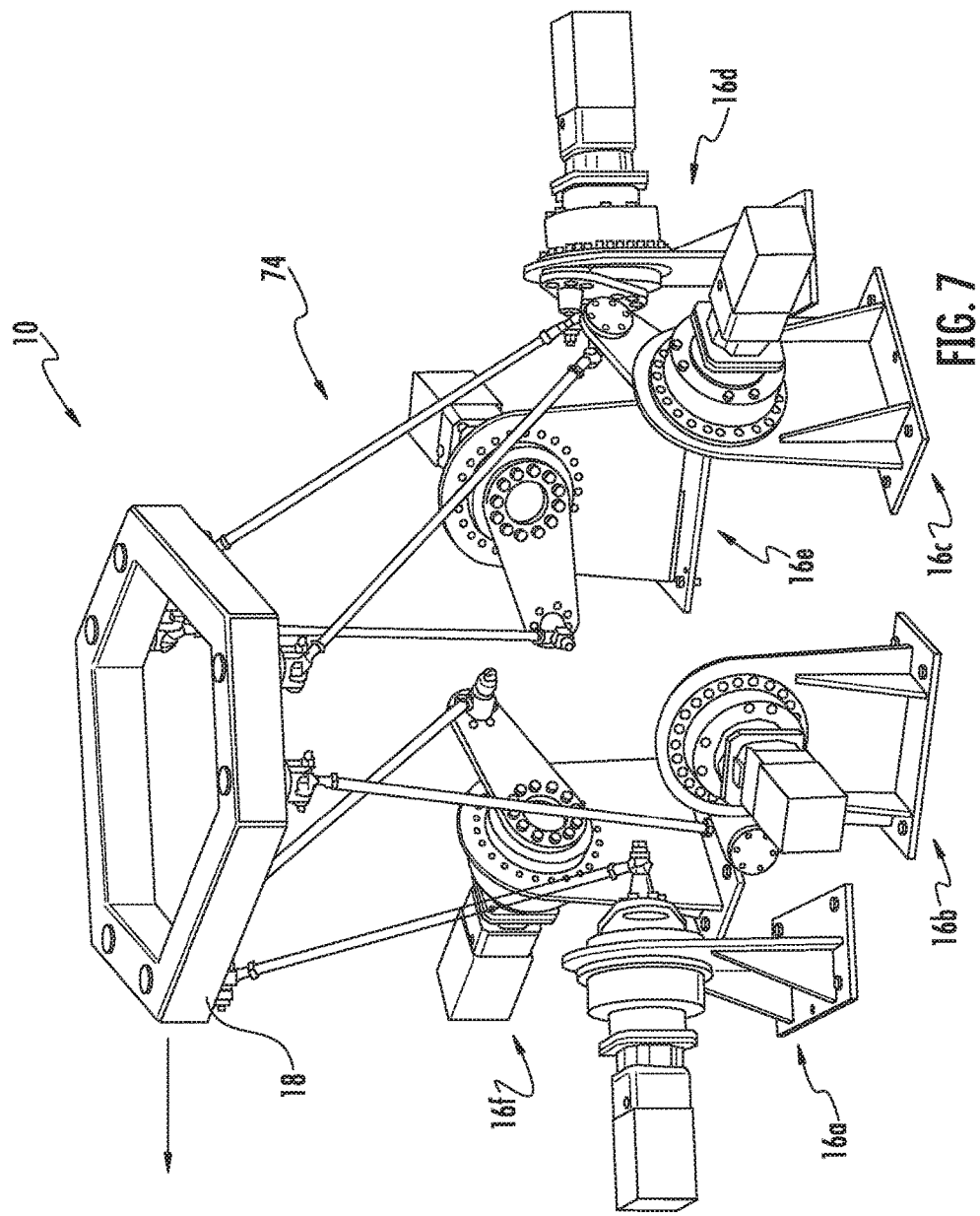
FIG. 7 is a perspective view of the Six Degree of Freedom in a surge movement.

The system is shown in a surge movement position 74 in FIG. 7. Wherein the cranks 40 are in varying positions and angles above and below the horizontal plane of the actuators 16 and parallel to the system base 12 as shown in the table of FIG. 14.

Figure 8:
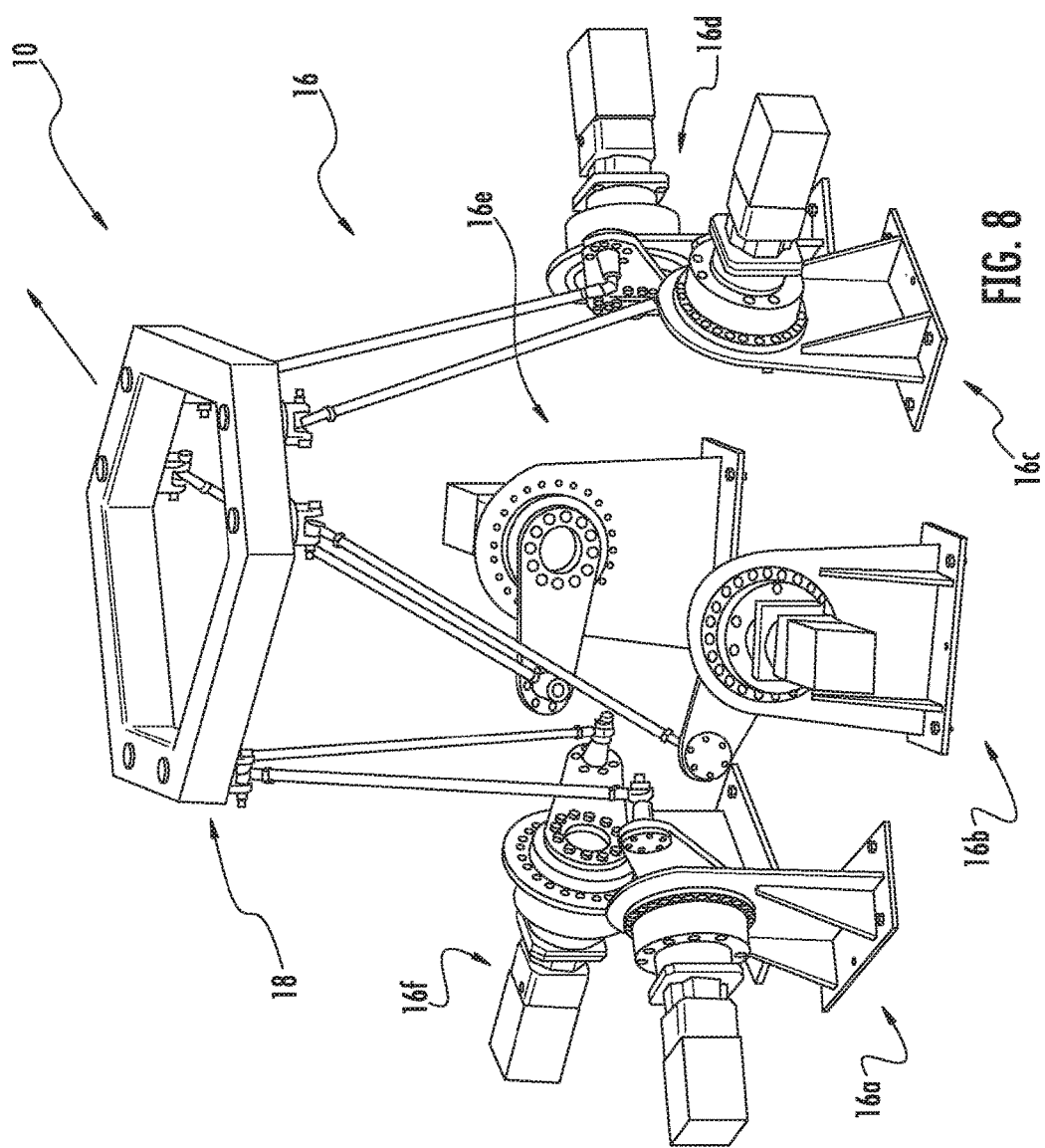
FIG. 8 is a perspective view of the Six Degree of Freedom system in a sway movement.

By way of further example, the system 10 is shown in a sway movement position 76 in FIG. 8. Whereas, the cranks 40 are in varying positions and angles above, below and even with the horizontal plane of the actuators 16 and parallel to the system base 12 as shown in the table of FIG. 14.

Figure 9:
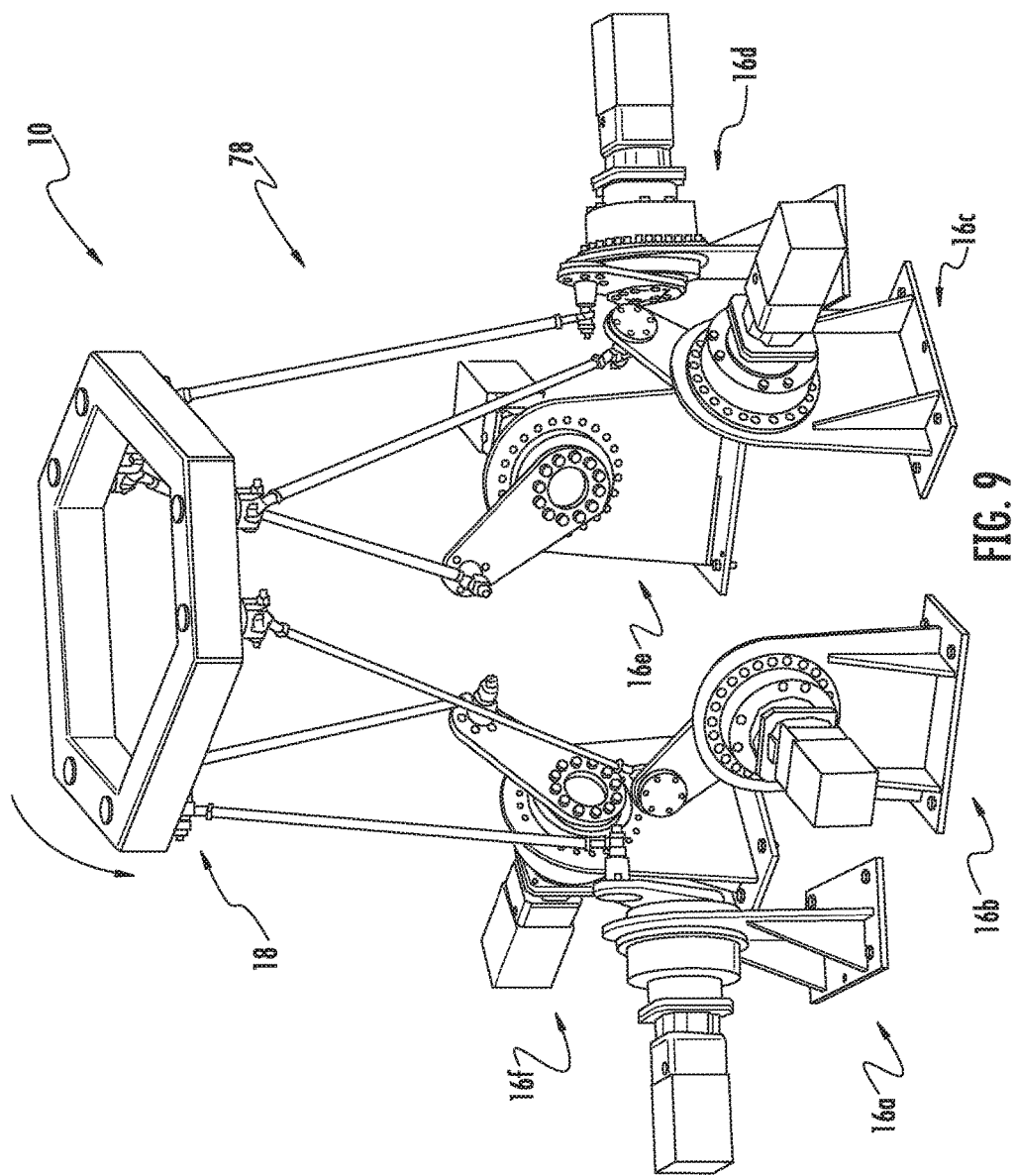
FIG. 9 is a perspective view of the Six Degree of Freedom system in a yaw movement.

Yet further, the system is shown in a yaw movement position 78 in FIG. 9, whereas the cranks 40 are in varying positions and angles above, below and even with the horizontal plane of the actuators 16 and parallel to the system base 12 as shown in the table in FIG. 14. The connector rods 58 are angularly disposed from the cranks 40 up to the connection at the platform 18.

Figure 12A:
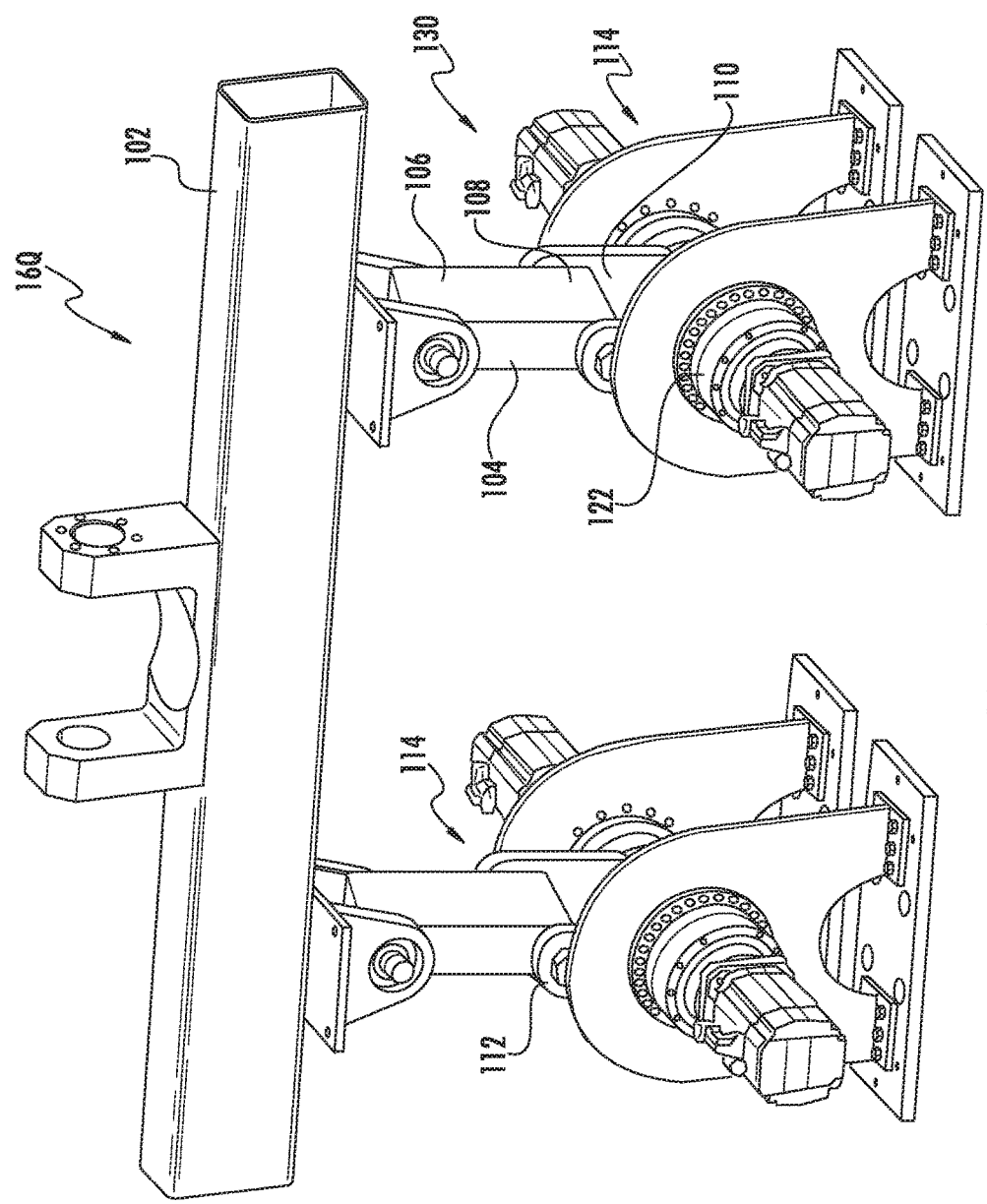
Figure 2B:
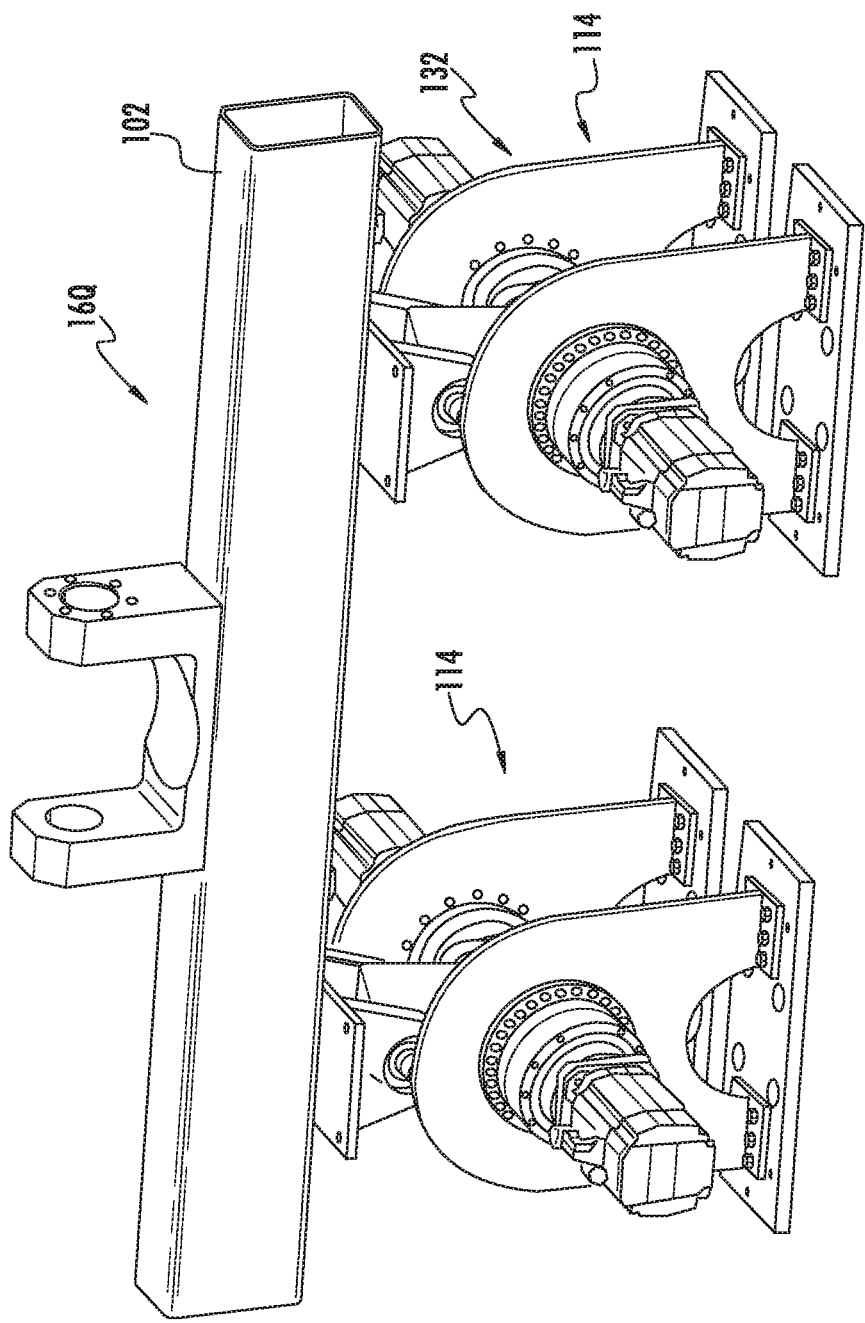

The positions of the actuators 16, illustrated with reference to FIGS. 12A and 12B, are for maximum excursions herein presented, by way of non-limiting example. The actuators 16 can be put into a plurality of intermediate positions as programmed through the control system. By way of example, the Table in FIG. 14 shows excursion distances for different types of movements such as pitch up and pitch down, roll left side up and roll left side down, yaw right and yaw left, surge forward and surge backward and sway left and right. The range of motion is particularly suited to applications such as used in flight and other training simulators, as well as amusement simulators.

In another embodiment of a motion system according to the teaching of the present invention, the 3 DOF system 100 as depicted in FIG. 13 is again referenced. As described for the system 10, earlier described with reference to FIG. 1, the motion system 100 comprises a foundation in the form of a system base 116. The motion system 100 also includes a plurality of actuators the actuators 16Q, earlier described with reference to FIG. 12. Each actuator 16Q is mounted on the system base 116 and spaced apart in a generally triangular arrangement. As above described, the system 100 includes the actuators 16Q having the motors/gearbox and crank assemblies connected to the load beam 102 with a U-fork styled connection 118. Each actuator 16Q is connected to the platform 18 via a swivel connector 120 connected to the U-fork connection 118. The three beams 102, herein described by way of example, accept the platform 18 via the U-fork connection 118. The top platform comprises three elongated sections forming a triangular platform 18. The platform 18 is configured to be connected to a system base for a particular motion simulation application, in this embodiment a motion system for an amusement embodiment, by way of example. In this 3-axis embodiment for the system 100, the platform may be that used in an amusement ride, as will be illustrated by way of example later in this disclosure.

Figure 13:
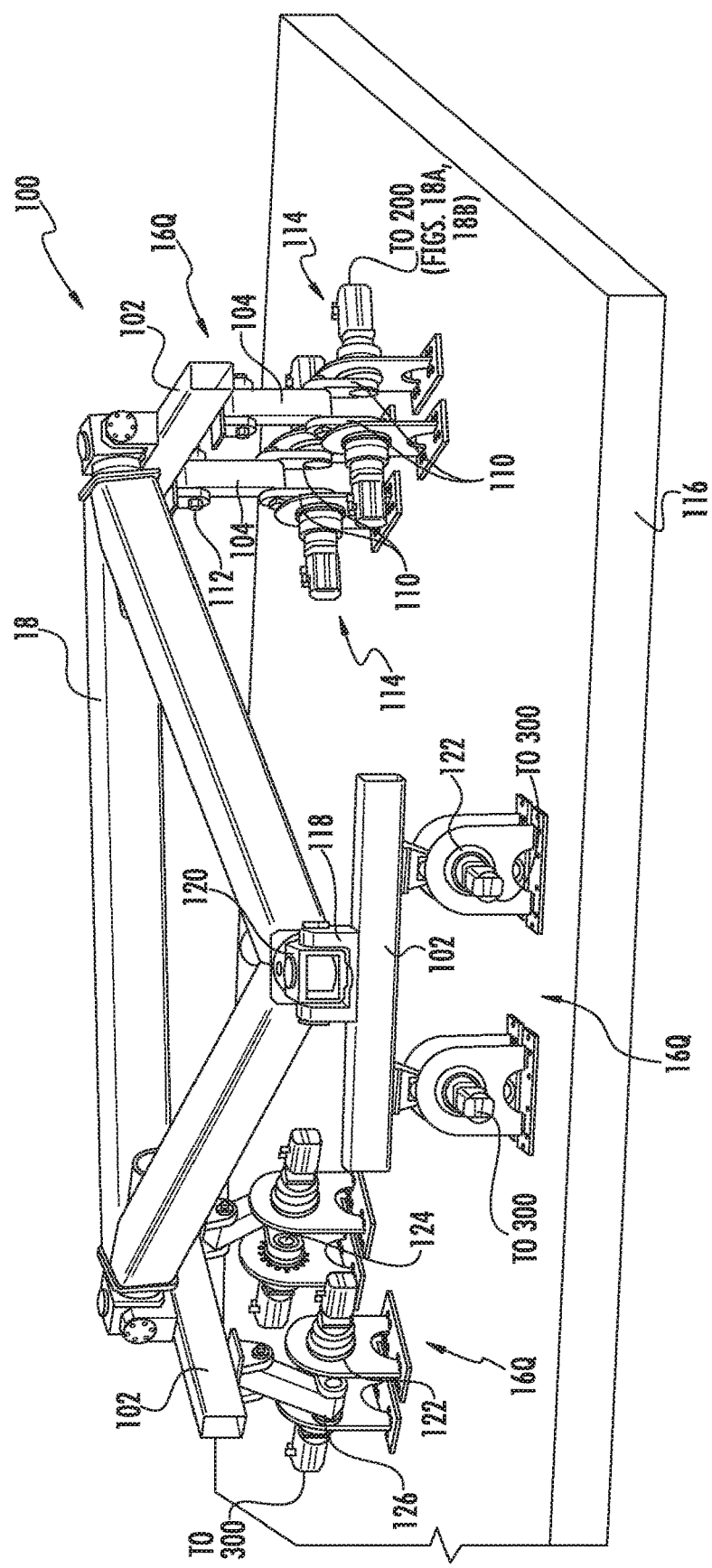
FIG. 13 is a perspective view of a 3-axis motion system according to the teachings of the present invention, wherein the system employs the actuators of FIG. 12 and shown in a neutral position.

Each of the actuators 16Q used in the three DOF system of FIG. 13 is comprised of components described for the actuator of FIG. 12, and as described earlier with reference to the actuator of FIG. 2. By way of example, each actuator includes a single pair of actuator supports. Each actuator support includes the base or foot 24 and vertical stand 26. Each foot 24 is connected to the system base 12 as the base and a vertical stand rises from each foot, as herein described by way of example. Optionally, the actuator stands 26 may be affixed directly to the system base 12 as a base without departing from the teachings of the present invention. Each stand 26 has an aperture in an upper portion configured to receive a motor/gearbox assembly which is comprised of an electric servo motor connected with a planetary gearbox which is engaged with a proximal end of the drive shaft which is driven by the motor. The motor, gearbox and shaft can be provided as a single unit herein referred to as "motor/gearbox assembly" or can be provided as separate components. As illustrated with continued reference to FIG. 12, the actuator 16Q includes two dual motor/gearbox assemblies with each of the four motor/gearboxes carried by a stand and each motor/gearbox operable with a crank 110 that is rotatable attached to first and second arm members 104.

The motor is an electrical servo motor that is controlled by the control system as described below, by way of example.

With reference again to FIG. 12, the actuator 16Q includes dual motor/gearbox assembly 114 pivotally connected to the crank 110 having an aperture 122 surrounding a distal end of a drive shaft 124 (visible in view of FIG. 13 and as shaft 36 in FIG. 2). The cranks 110 are rigid, elongated members having a face that is connected perpendicularly to the plane of the longitudinal axis of the drive shaft in a first end portion, as above described with reference to FIG. 2. The distal end of the crank receives the arm member 104 using a bearing 126 connected through a second aperture in the cranks. The lower bearing connects the cranks to arm members and selected to allow rotational movement within a plane. The two cranks drive each arm member of the two arm members used for the actuator 16Q herein described by way of example. The use of four motors allows for additional power and thus supports heavier than typical payload structures.

As was described for the connector rod 58 of FIG. 1, the arm members 104 have an elongated form in a predetermined length determined to provide desired motion for the application. The dual motor/gearbox assemblies 114 of the actuator 16Q can move independently to move the load beam 102 into various positions. The arm members and cranks are arranged to allow the crank to rotate 360 degrees and the arm member to travel through a full circle for certain desired applications. As the arm member travels through its path, the platform is moved to a range of orientations as desired for a 3 DOF system, as above described with reference to FIG. 1 for a 6 DOF system. With three connections 120 attached to the three load beams 102, the platform 18 is effectively moved through motion having three degrees of freedom motion.

By way of example, the actuator 16Q illustrated with reference again to FIG. 12 may be considered as shown in a neutral position 128, with the actuator 16Q shown in a fully extended up position 130 in FIG. 12A and full down or lowest position 132 in FIG. 12B. As will be understood by those skilled in the art now having the benefit of the teachings of the present invention, various rotations of the cranks will provide various orientations within the 3 DOF system 100, as desired.

Figure 11:
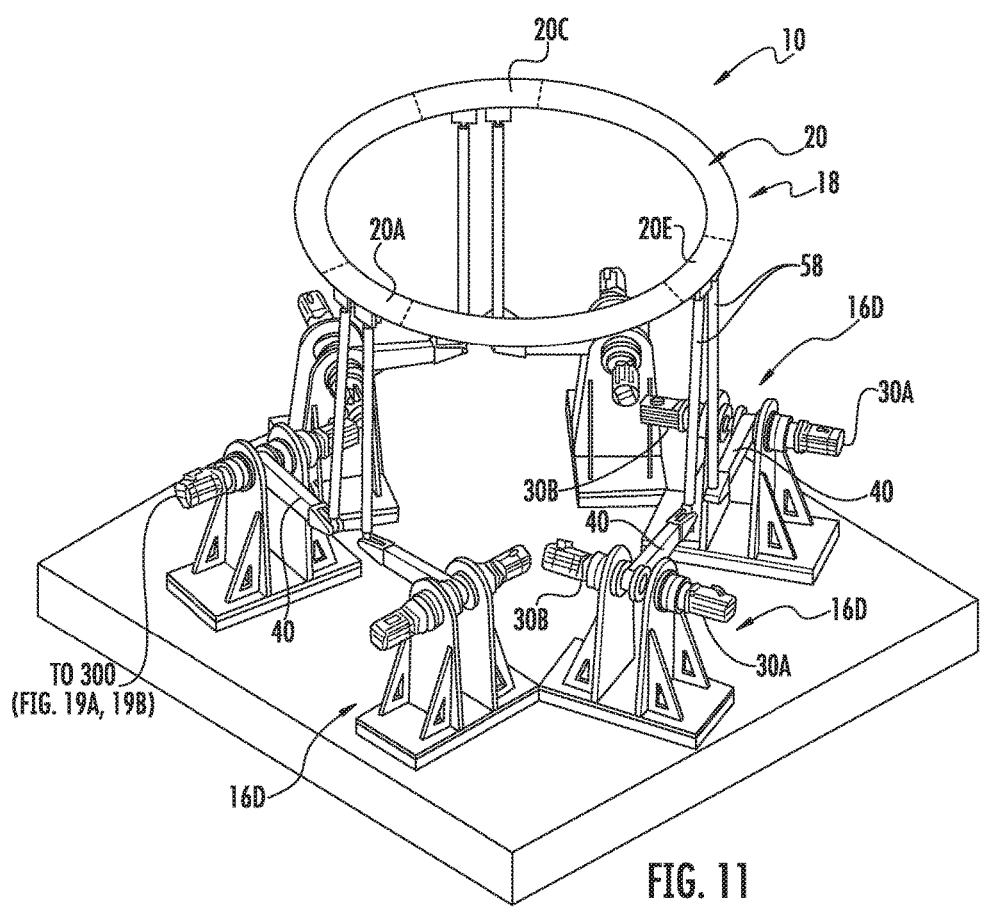
FIG. 11 is a perspective view of a Six Degree of Freedom 6-axis system employing dual motor/gearbox actuator assemblies.
Figure 15:
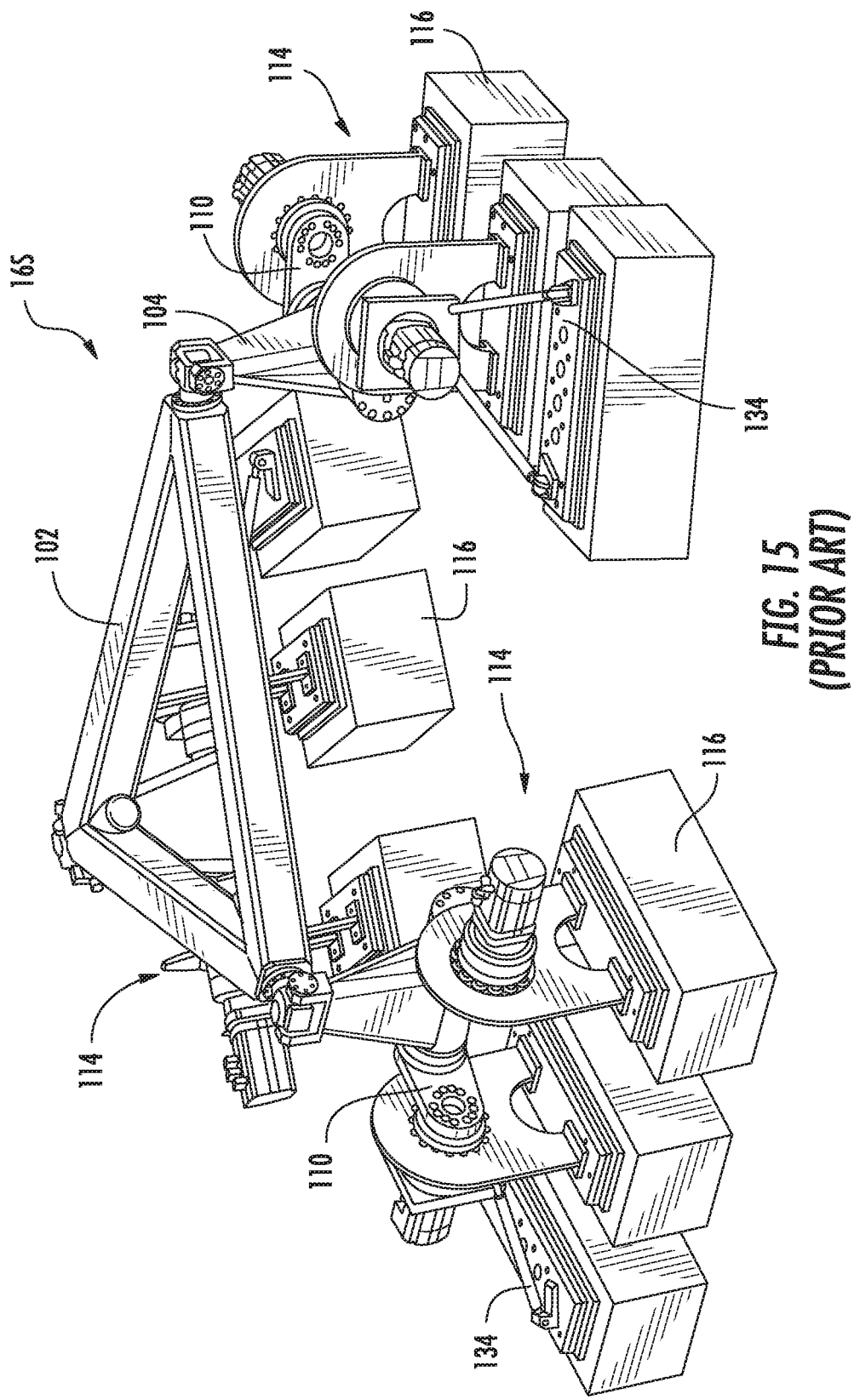
FIGS. 15 and 16 are perspective and top plan views, respectively, of a known actuator having a six motor/gearbox assembly used in a European amusement ride as the motion system, yet not as an actuator as herein described.
Figure 16:
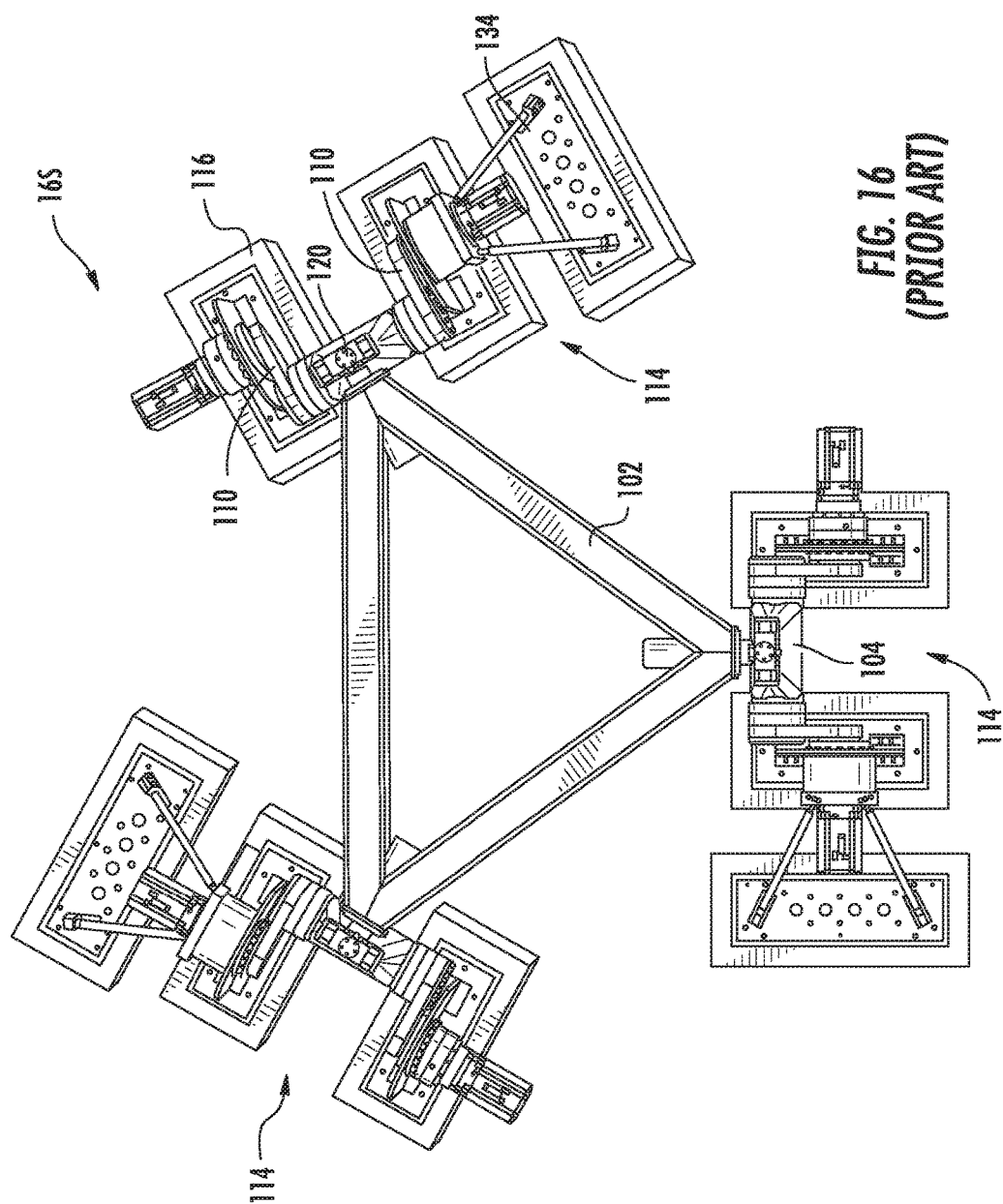

By way of further example while keeping within the teachings of the present invention, in addition to actuators being configured as the actuator 16 of FIG. 2 having a single motor/gearbox assembly 30, the actuator 16D of FIG. 11 having a dual motor/gearbox assembly 114, and the actuator 16Q of FIG. 12 having a quad gearbox assembly 16Q, an actuator having a six motor/gearbox assembly 16S, as illustrated with reference now to FIGS. 15 and 16 is desirable for relatively heavy payloads, and includes components as generally described with reference to FIG. 12, wherein the beam 102 is configured as a triangular beam and three dual motor/gearbox assemblies 114 are operably and pivotally connected to the triangular beam 102 in FIGS. 15 and 16, by way of example. Actuator supports 134 are anchored to the system base 116 for providing increased stability to the actuator 16S. By way of example, three such actuators 16S (illustrated in FIGS. 15 and 16) may be connected to the platform 18, as earlier described with reference to FIG. 13, thus substituting the actuators 16Q with the actuator 16S at the three connect locations 118. As herein illustrated with reference again to FIG. 11 for a 6 DOF system and FIGS. 15 and 16 for a 3 DOF system, dual motor/gearbox assemblies may be employed according to the teachings of the present invention.

Figure 18A:
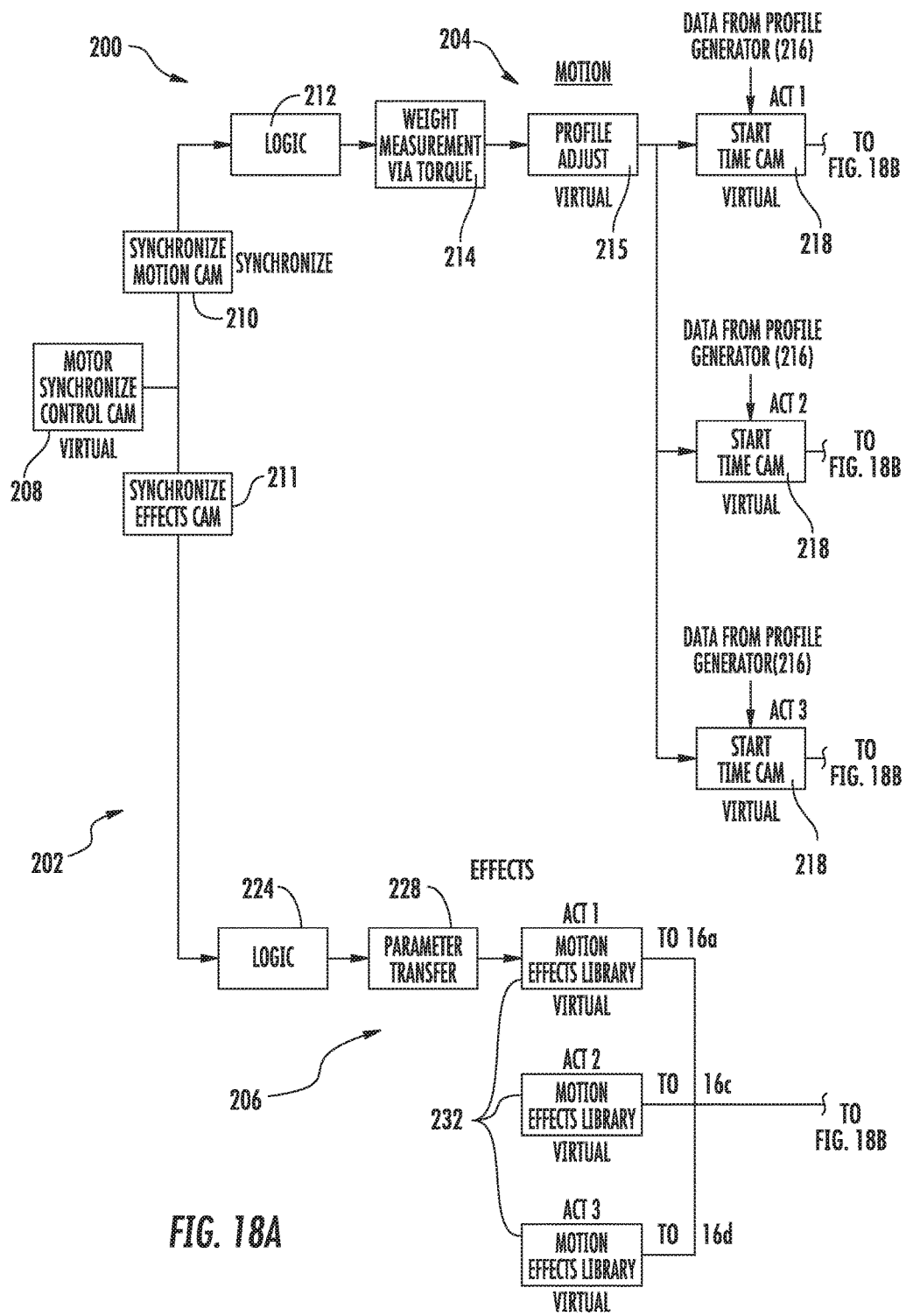
FIGS. 18A and 18B together include a flow chart of one control system illustrating process and logic functions for a three degree of motion system, according to the teachings of the present invention.
Figure 18B:
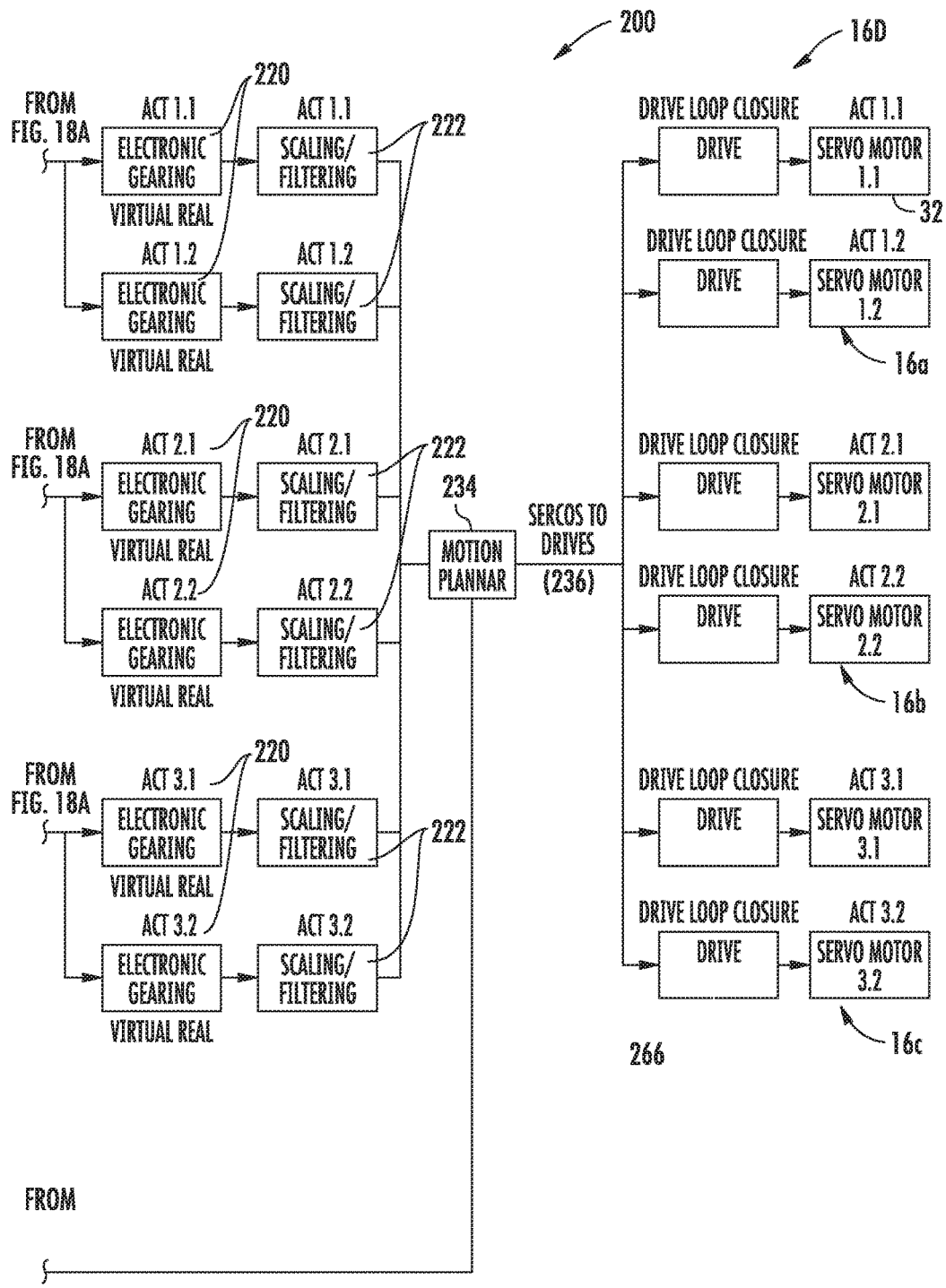
Figure 19A:
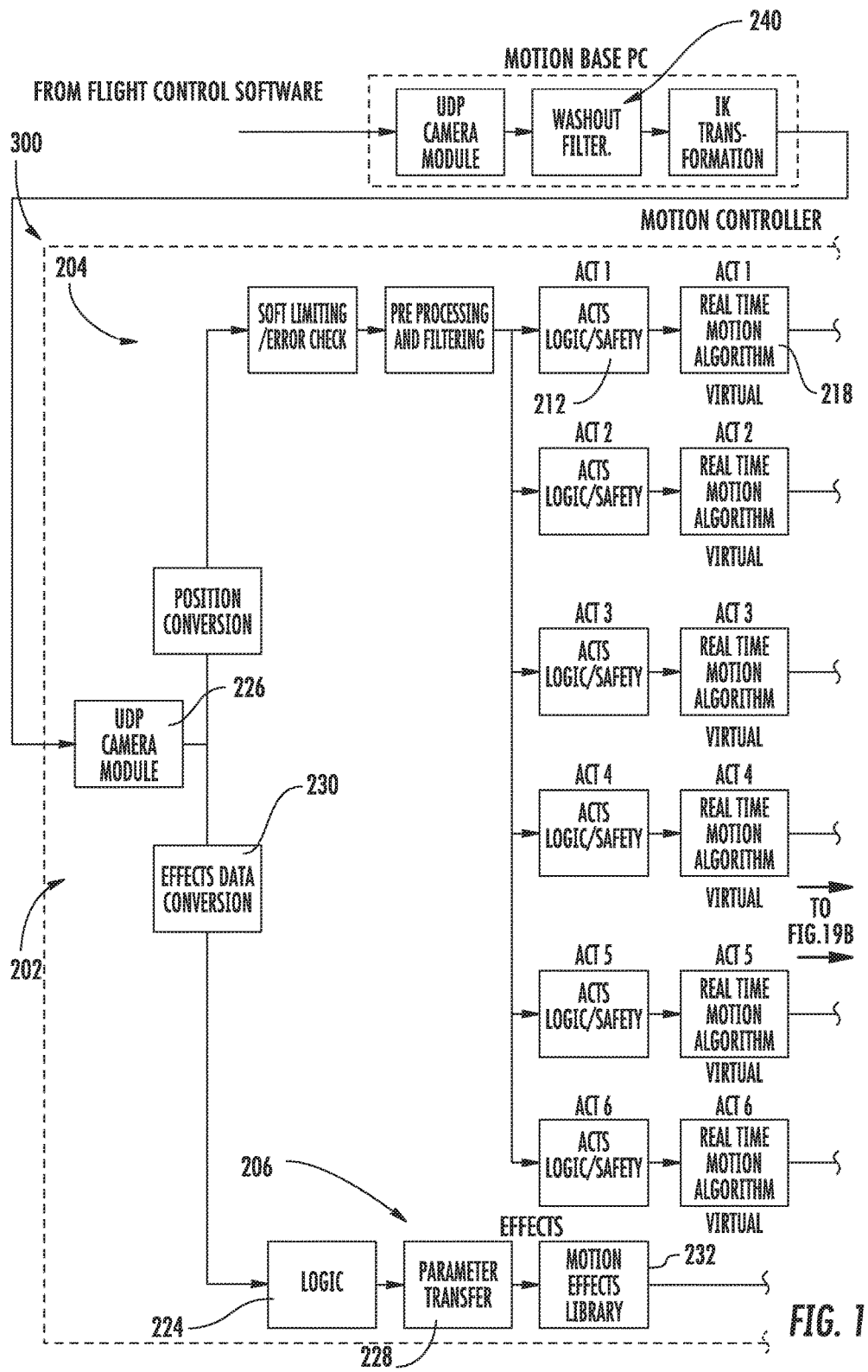
FIGS. 19A and 19B together include a flow chart of one control system illustrating process and logic functions for a six degree of motion system, according to the teachings of the present invention.
Figure 19B:
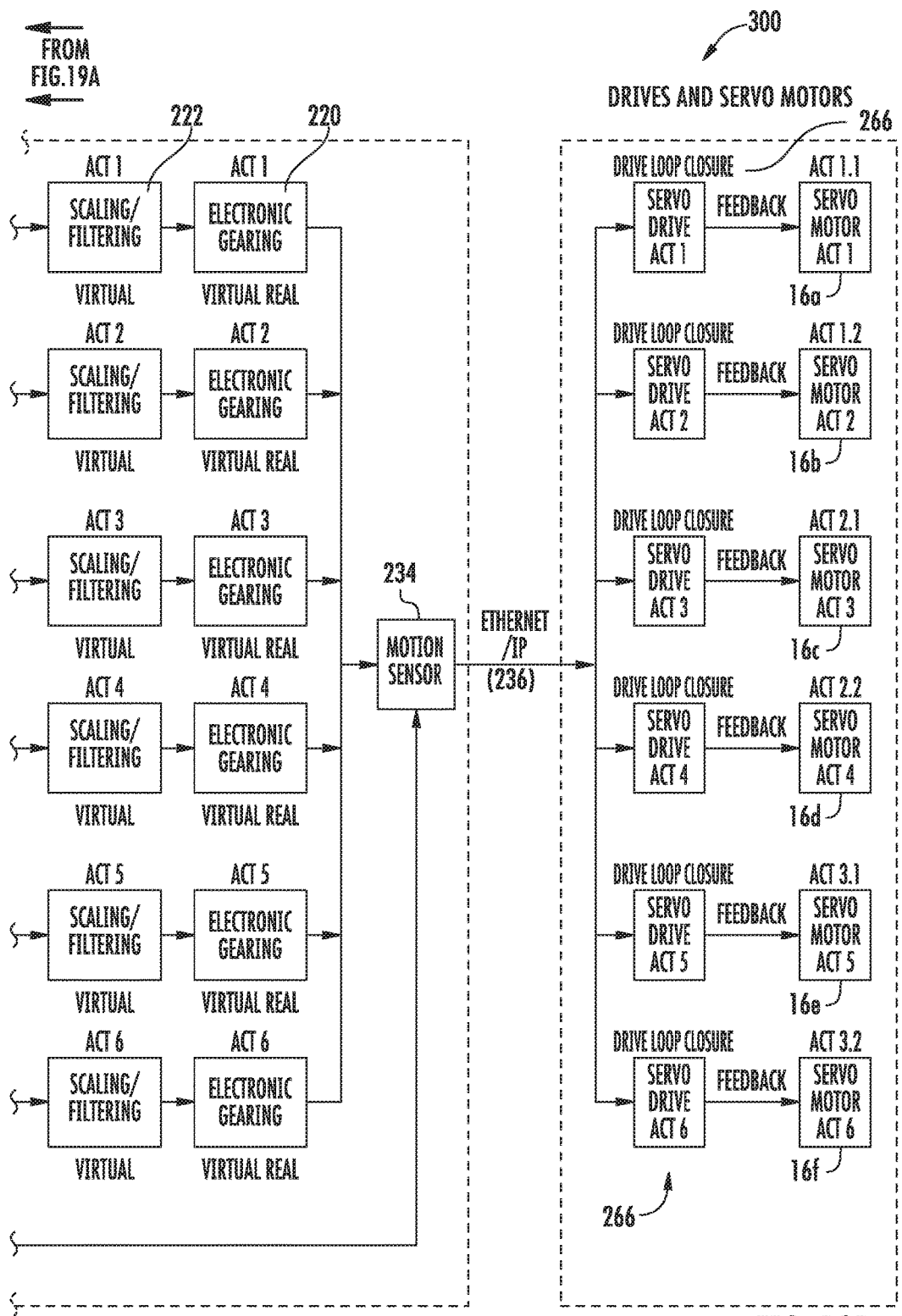

The motion systems 10, 100 herein described include control systems 200, 300, respectively, for controlling the 3 DOF and 6 DOF movements herein presented by way of example with reference to FIGS. 18A, 18B and 19A, 19B, respectively. Generally, the 3 DOF control system controller 200 and the 6 DOF controller 300 send signals to the servomotors 32 within the actuators 16 to drive the platform 18 operably connected to the actuators 16 moving through desired positions, as above described. By way of non-limiting example, the controller 200 illustrated with reference to FIGS. 18A and 18B is useful with an amusement ride where the audience may be considered passive and has no input to the motion profile. In contrast, for a simulation system having an active audience, such as a pilot in a flight simulator using a joystick or steering mechanism, the controller 300 of FIGS. 19A and 19B is appropriate.

The controllers 200, 300 send signals to vary the speed and movement of the servo motors 32 and to move the actuator 16 into a desired position by moving the crank 40 through a path of rotation and the connector rod 58, or arm members 104, by way of example, through a path across multiple axes of rotation. By way of further example, a signal representing a desired degree of pitch may be sent to motion algorithms in control software operable in a processor 202 which then converts the desired pitch for actuator positions, as illustrated with reference again to FIGS. 3-9.

With reference again to FIGS. 18A, 18B, and 19A, 19B, the controllers 200, 300 are modular and are herein described as including a motion profile processor 204 and an effects processor 206.

By way of example, reference is now directed to FIGS. 18A, 18B, wherein the profile processing includes a Master Synchronize Control Cam Module 208. This module 208 generates a master timing reference so that all other modules operable within the controller 200 can synchronize their movement or actions to a master synchronizing signal provided by the module 208. A Synchronize Motion Cam Module 210 is responsible for synchronizing the motion cam to the master cam and also has the ability to delay the start of the motion cam by a user programmable amount of video frames (based on a frame rate or time base) so that the motion can be perfectly/desirably synchronized with external media devices, by way of example. Likewise, and as will be described later, a Synchronize Effects Cam 211 is used for synchronizing an effects cam to the master cam and also has the ability to delay the start of the effects cam by a user so that the desired effect can be perfectly/desirably synchronized.

With continued reference to FIGS. 18A, 18B, a Logic Module 212 within the motion profile processor 204 ensures each motion axis is functioning as desired, and that the actual position of the axis is following a commanded virtual position. Either appropriate corrective action is taken or the system 10 is shut down depending on the amount of error. This check forms a primary basis for ensuring each axis stays synchronized within acceptable desirable tolerances.

Figure 17A:
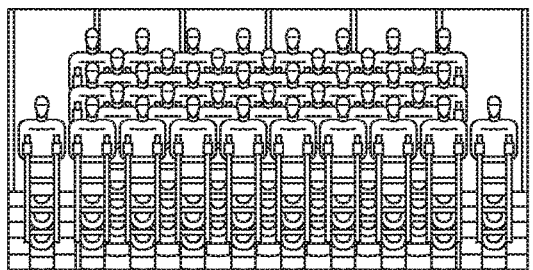
FIGS. 17A-17G are multiple views illustrating one amusement ride using the motion simulation systems herein described by way of example for various position locations within a ride.
Figure 17B:
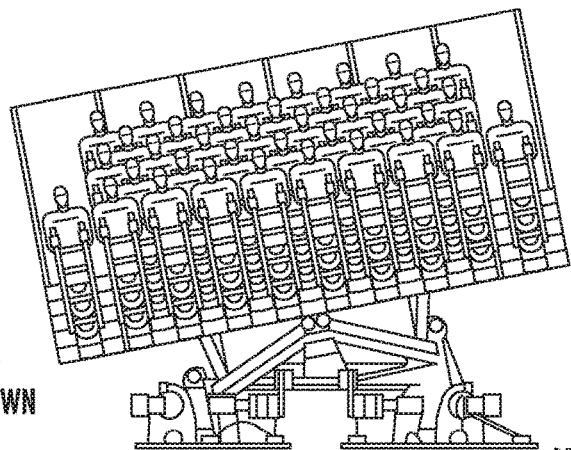
Figure 17C:
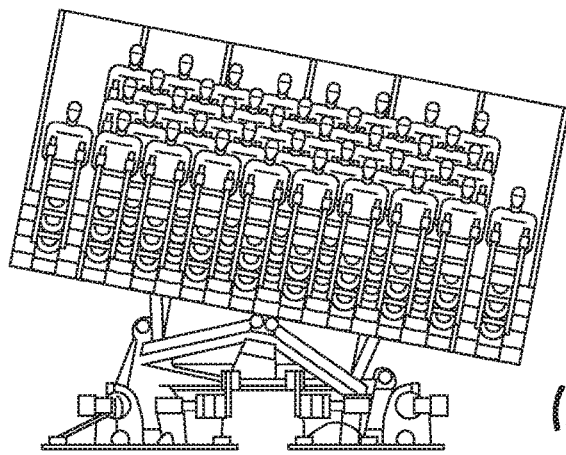
Figure 17D:
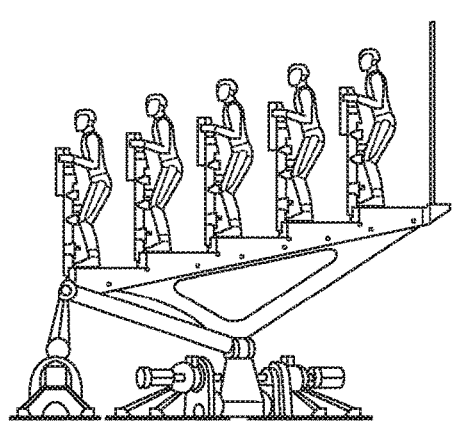
Figure 17E:
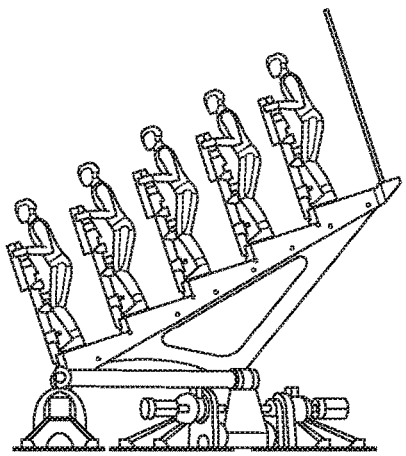
Figure 17F:
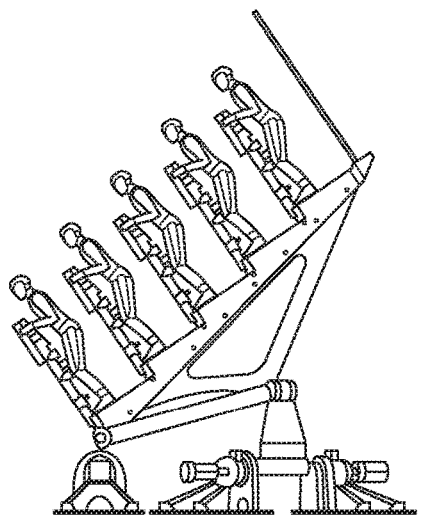
Figure 17G:
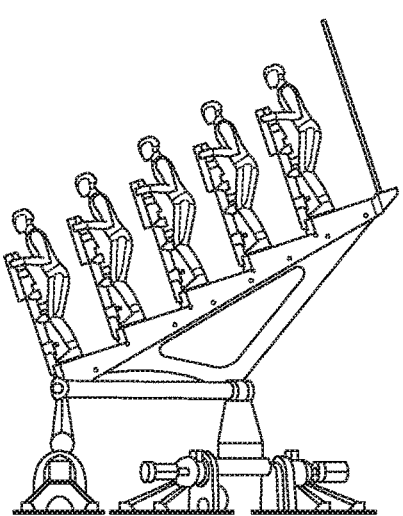

Weight measurements are made using torque, where in a Weight measurement Module 214 calculates a weight of the system 100 after passengers have boarded, as earlier illustrated with reference to FIG. 17A. The weight is calculated when the system base 116 is in its neutral position 128, as illustrated with reference again to FIG. 13, by measuring the torque required at each motor within the respective gearbox assembly 114 to hold the system 100 static against gravity at a neutral position which may be selected at zero degree inclination depending upon the system configuration. A triangulation method is then used to determine the center of gravity (CG) and moments of inertia. By way of example, the information derived by the Weight Measurement Module 214 is then used to adjust a pre-programmed ride profile using a Profile Adjust Module 214 to ensure a consistent ride experience independent of weight and weight distribution within the limits of the system performance (a maximum acceleration profile, by way of example).

With continued reference to FIGS. 18A, 18B, data from a motion profile generator 216 are provided to the controller 200 and used by the Time Cam Modules 218 operable with each actuator in the system.

The motion profile generator 216 creates ride-film motion profiles, synchronized with a given film. The profile generator 216 includes a software package that allows a film to be displayed with typical controls such as Play, FFWD, RWD and the like. The software allows for a connection of a Joystick which enables a user to record a profile (Pitch, Roll, Heave, and the like) while watching the film, as may be desired. The profile is recorded in synchronization with the film by monitoring frame changes. The profile can be modified using a set of software tools in terms of amplitude, by way of example. Also, a mouse may be used to modify or touch up the profile as desired. The software contains suitable Inverse Kinematic algorithms to convert recorded data into the required actuator radial positions. The software contains an algorithm which filters points within the profile based on a rate of change of each point. By way of example, in order to obtain a smooth profile where there was no intentional induced jitter, any points that were recorded and not smooth are removed and smooth splines are created between subsequent recorded points. By way of further example, if a high frequency movement (a fast joystick movement) is required, these points are recorded. These data are sent to the controller to be used within the virtual cam system. The effects data is also created within the profile generator software and encoded, again for use within the controller.

By way of supporting example and as is well known, a cam is a rotating or sliding piece in a mechanical linkage typically used to transform rotary motion into linear motion or vice versa. A virtual cam, as herein described for embodiments of the invention, mathematically provides such transformations. As is also known, inverse kinematics refers to the use of kinematics equations of a robot, by way of example, to determine joint parameters based on a desired position of an end effector. Specification of the movement of the robot so that its end effector achieves a desired task is generally known as motion planning. The inverse kinematics transforms a motion plan into joint actuator trajectories.

The Time Cam Module 218 is responsible for starting and stopping the time Cam functions based on external conditions, such as other system readiness, system safety, error checking, and the like. By way of example, the Time Cam Module 218 is responsible for calculating the real world motion data in the form of continuous splines based on pre-programmed positional data.

With continued reference to FIGS. 18A, 18B, an Electronic Gearing Module 220 links the virtual axis (i.e. a mathematical model of a real axis) to the real axis of motion for each actuator through a virtual gearing system, whose ratio can be adjusted dynamically, thus allowing fine correction of profiles following errors or desired modifications as required. As illustrated, the Electronic Gearing Module 220 will be operable with each actuator and with each of the two gearbox assemblies of the actuator, herein described by way of example. In addition, a Scaling/Filtering Module 222 provides an ability to attenuate or increase actuator movement based on a percentage value as required. By way of example, this is how a profile is adjusted on a "Flyboard" based on mass distribution, earlier described with reference to FIG. 17A.

With reference now to both FIGS. 18A, 18B and 19A, 19B, the Effects Processor 206 is herein described, by way of example, as including an Effects Logic Module 224 used to determine when to call an effects library based on data for pre-programmed effects from a Cam Module 226, as illustrated with reference to FIG. 19A or equivalent, by way of example. A Parameter Transform Module 228 decodes the data which is encrypted within the Effects Cam Data Module 230, by way of example, and governs the effect type, amplitude and frequency of the effect. A Motion Effect Library Module 232 receives the data that were converted (step 21) and moves a virtual axis in a reciprocal manner, which virtual movement is superimposed onto the main actuator within the motion planner as above described.

With continued reference to FIGS. 18A, 18B and 19A, 19B, a Motion Planner Module 234 receives profile and effects data from all axes and combines movements into one synchronized movement. These data are then sent to the drives, gearbox assemblies 114 of FIG. 13 by way of example, via a SERCOS data bus 236 at a coarse update period of 1 ms. These data are then further interpolated within the drive at around 150 micro seconds. Typically in the art of motion simulation, motion simulation and effects to the motion are delivered in one profile or analog signal sent to move an actuator accordingly. The teachings of the present invention and embodiments for the controllers 200, 300 herein described, separate motion and effects so that they are not dependent upon frame rate of a film and once motion and effects are processed via the virtual cams as herein described, motion and effects are then combined by the motion planner 234.

One of skill in the art, now having the benefit of the teachings of the present invention will appreciate that the modules herein described with reference to FIGS. 18A, 18B for the 3 DOF system may be employed for the 6 DOF controller of FIGS. 19A, 19B.

For the controller 300, a washout filter 240, as illustrated with reference to FIG. 19A may be employed, and is particularly useful with pilot training simulators. The washout filter 240 is used to transform input forces and rotations of a vehicle into positions and rotations of the motion platform 18, or body to which it is attached, so that the same forces can be reproduced using the limited motion envelope of the motion platform. As above described, the control systems 200, 300 provide control of the actuators 16, 16D, 16Q, 16S for recreating acceleration, reducing the acceleration to zero while sending the control system 10 to a neutral position below a level of perception of a user of the system, by way of example. The washout filter 240 herein described is an implementation of a classical washout filter algorithm with improvements including a forward speed based input signal shaping, extra injected position and rotation, extra injected cabin roll and/or pitch, and rotation center offset from the motion platform center when in the neutral position, as above described with reference to FIGS. 3-9.

Figure 20:
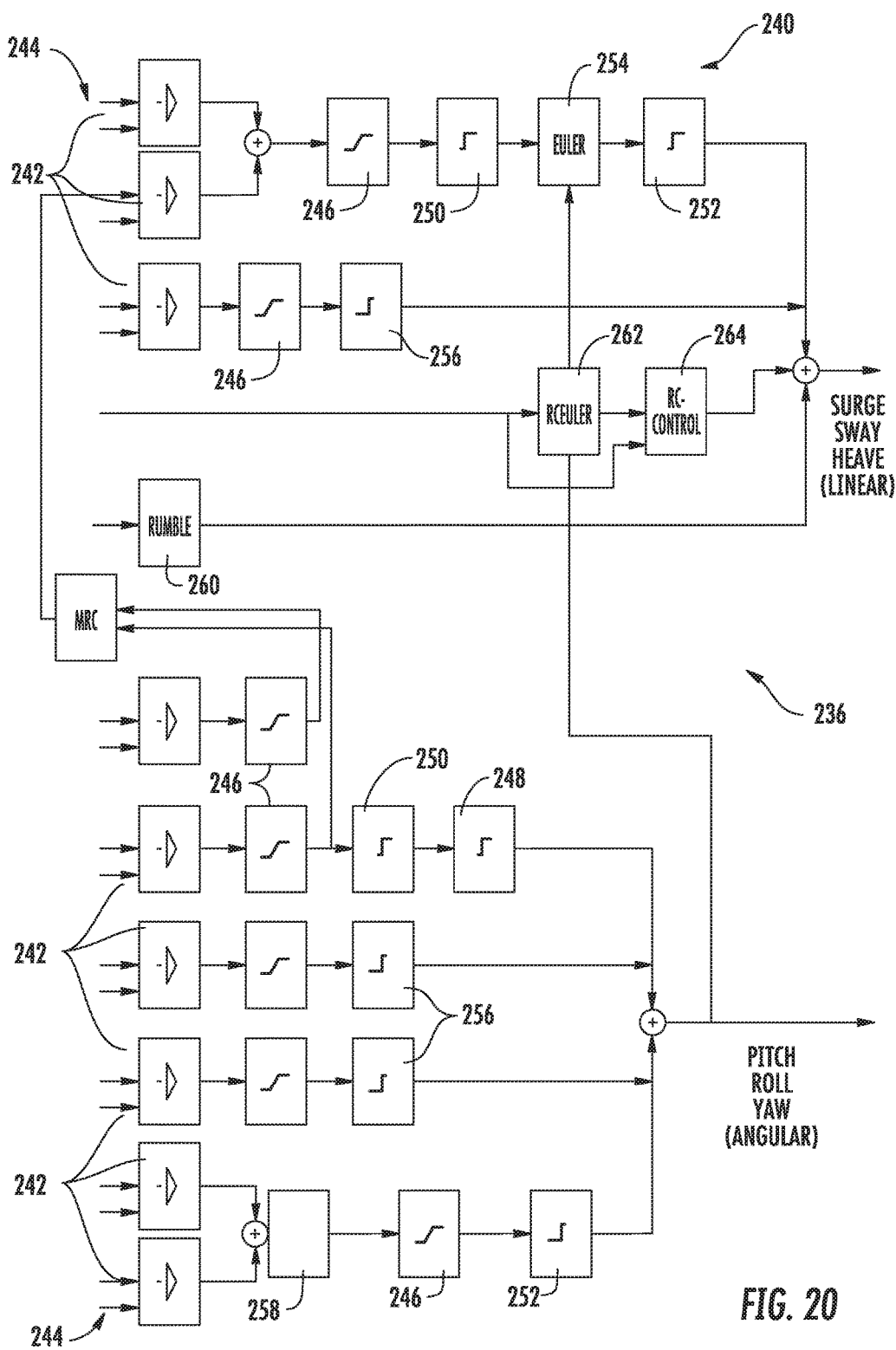
FIG. 20 is a flow chart illustrating one modular architecture of a washout algorithm according to the teachings of the present invention.

With reference now to FIG. 20, a block diagram for one Washout Filter 240 according to the teachings of the present invention is provided by way of example. The classical washout algorithm is the most common motion-drive algorithm used in simulators. Because of such constraints as physical limits, and actuator rate limits, filtering between vehicle accelerations, by way of example, and the calculated motion cues are essential. Washout filters generally serve to attenuate the low frequency accelerations that cause the motion base platform 18 to reach its limitations, while keeping high frequency accelerations unchanged. The high frequency accelerations last for a small duration of time, and thus will not drive the motion base platform 18 to its physical limits if a proper high-pass filter break frequency is chosen. The filters also serve to bring the motion base platform 18 back to its zero reference point, hence the term "washout" filter. Low-pass filters are also used to reproduce the low frequency accelerations typically sensed in an aircraft. This method is called tilt-coordination, and utilizes the gravity vector by tilting the platform 18, and thus cockpit attached thereto to a commanded angle such that sustained accelerations are simulated by gravity.

The Washout Filter Module 240 is used to transform input forces and rotations of the vehicle into positions and rotations of the motion platform 18 so that the same forces can be reproduced using the limited motion envelope of the motion platform. This Washout Filter Module 240 includes known Classical Washout Filter algorithms with improvements including Forward speed based input signal shaping; Extra injected position and rotation; Extra injected cabin roll/pitch; and Rotation center offset from the motion platform center when in the neutral position, by way of example.

The Washout Filter Module 240 may be described as comprising two main streams including the high frequency accelerations and rotations (Short term and washed out) and the low frequency accelerations (Gravity Vector). The high frequency accelerations are responsible for producing the short platform movements and rotations within the limited platform motion envelope, while the low frequency accelerations are produced by a tilt-coordination using the "g" component when the platform is tilted.

All input signals are first conditioned using a variable (smoothed) gain filter and limited using a smoothed limiter filter. The high frequency accelerations and rotations are first filtered by a high-pass filter and after that integrated twice to produce the desired platform high frequency position and rotation. The low frequency accelerations are also converted to a tilt co-ordination and filtered by a low-pass filter with a limiting output speed, acceleration and onset value. The externally injected platform position and rotation signals together with the cabin roll signals are first conditioned and low-pass filtered and subsequently added to the resulting platform position and rotation. The washout filter herein described is based on a right hand coordinate system where the x direction is forward, y direction is right and the z direction is down, by way of non-limiting example.

With continued reference to FIG. 20, specific groups of functions are presented including gain blocks, and although there are many of them, it is to be understood that they perform generally the same function but with different constants and different data streams. The order and position each is placed within a data stream is herein described.

Multiple Gain Filters 242 are employed as illustrated with reference to FIG. 20, and as described above, input signals 244 are passed through this filter to first take out any noise in the input signal (thus a smoothing) and then to adjust the amplitude of the input signal so as to be useful for operation with the controller 300. By way of example, the input signals 244 include signal representative of linear and angular motion and can either be boosted or attenuated as required. The amount of gain is dynamic depending on the signal level. By way of example, 3 bands may be used and different gains set for each band.

With continued reference to FIG. 20, Soft Limiter Filters 246 provide a limit for the signal being processed before further processing is completed. By way of example, a severely high signal level may be generated from the synthetic flight environment and if not limited, severe motion or damage may occur. By using the Soft Limiter Filter 246, a guard against such a possibility is provided. Internally, this filter 246, a limiter, limits looks at the signal amplitude and if higher than a preset amount, returns the preset amount, otherwise the input signal is returned. High frequency signal treatment is provided by High Pass Filters 248, wherein a Step Limiting High Pass Filter 250 allows the higher frequency parts of the signal onto the next processing section. However, the output is limited to a pre-programmed constant. A Second High Pass Filter 252 allows the higher frequency parts of the signal after Euler translation 254 has taken place, wherein the output is not limited.

With continued reference to FIG. 20, low frequency signal treatment is provided by Low Pass Filters 256, to allow the lower frequency parts of the signal not to be sustained. The Low Pass Filter 256 allows the low frequency signal to pass. However, the signal can also be limited, in terms of speed, acceleration and onset. The purpose is to simulate a gravity vector hence this signal is sustained at a predefined decay rate.

A Gravity Gain Filter 258 calculates the actual platform inclination before filtering takes place. By way of example, the input signals 244 are integrated twice to convert axial accelerations to position.

A Rumble Module 260 generates a synthetic rumble effect, specifically to create ground vibration and also turbulence. The generated signal is superimposed onto the incoming signal at a final summation stage. RCEuler and RCControl Modules 262, 264 are employed to calculate required platform movement offsets when the platform position has to be offset when in the neutral position, due to cabin placement and the like, by way of example. The Euler modules 254, 262 carry out Euler transformations which ultimately transforms an inertial frame of reference (flight control system, by way of example) to the frame of reference as required by the motion base using various rotation matrix operations.

As above described, the washout filter 240 has two main streams, including high frequency accelerations and rotations (short term and washed out), and low frequency accelerations (a gravity vector). The high frequency accelerations are responsible for producing the short platform movements and rotations within the limited platform motion envelope, while the low frequency accelerations are produced by a tilt-coordination using a "g" component when the platform 18 is tilted. All input signals are first conditioned using a variable (smoothed) gain filter and limited using a smoothed limiter filter. The high frequency accelerations and rotations are first filtered by a high-pass filter and after that integrated twice to produce the desired platform high frequency position and rotation. The low frequency accelerations are also converted to a tilt co-ordination and filtered by a low-pass filter with a limiting output speed, acceleration and onset value.

The externally injected platform position and rotation signals together with the platform or cabin roll signals are first conditioned and low-pass filtered and subsequently added to the resulting platform position and rotation.

The Euler filters provide an Euler transformation (3D rotation algorithm) and is capable of rotating more than one vector. The input and output parameters specify arrays of vectors. The rotation angles are also specified. The high pass filters offer an analogue 2nd order high-pass filter functionality. The output of the filter is double integrated to determine position from acceleration and can be reset via a Boolean approach. The low pass filter offers an analog 2nd order low-pass filter with limiting output functionality. The output signal velocity and acceleration can also be limited. Input signal values may be limited to be used depending on the location within the simulated airspace: "on the ground" or "in the flight". The RC Control filter provides a rotation center control algorithm to slowly move the platform 18 towards the neutral position 66, as earlier described with reference to FIGS. 3-9, when rotation takes place around another location other than the neutral position. An input and output 3D location and the location of the rotation center is used.

With continued reference to FIG. 20, the Rumble filter provides a velocity dependent noise signal that can be used to generate a track rumble effect. Output is not reset to zero when the velocity is zero. A first order high pass filter must be used in case the output must return to zero. The frequency of this first order high pass filter can be set as desired. The soft limiter filter offers a limiting function for an input signal, the limiting of this filter is smooth between lower and upper values which can be set independently. The high pass filters provide a 2nd order high-pass filter functionality with a limited step size function. The gain filters offer a variable gain functionality. It offers three different gains, by way of example. If the input value is <X1, Gain1 is applied. If the input value is between X1 and X2, a linear interpolated gain (between Gain1 and Gain2) is applied. If the input value is between X2 and X3, Gain2 is applied. If the input value is between X3 and X4, a linear interpolated gain (between Gain2 and Gain3) is applied. If the input value is >X4, Gain3 is applied.

The motion simulation systems, herein described by way of example, have improvements in a number of areas and provide desired solutions to needs identified in the art of motions simulation, including the need for a motion simulation system with improved control and synchronization between the physical motion and response time to provide a smooth motion and experience. In addition, and as above described, desired payload requirements are met and exceeded by embodiments according to the teachings of the present invention, and are provided with a smoothness of performance for a realistic motion experience. By way of example, a payload exceeding 20 tonnes for a 3 DOF system, as herein presented by way of example, significantly exceeds payload capability for hydraulic and electric ball screw systems.

By way of example, the components above described, such as the actuators, work through all levels of axis systems including 1-axis, 2-axis, 3-axis and 6-axis systems. The platform of the motion systems provides for variable configurations which can be used for different simulator applications. For example, in a flight simulator, the cranks 40 and the connector rods 58 can be adjusted to configure the system 10 for different aircraft types. The flexibility of configuration is enabled by changing the cranks 40 and/or the connector rods 58 by having adjustable cranks and connector rods, or may easily be replaced with cranks and/or connector rods of different lengths or geometries. This flexibility is provided by the ability of the control system to be programmed for different configurations and to control the movement of the actuators and platform. Such a variable system has not been accomplished to date. Embodiments of the present invention provide improvements over known systems which are geometrically fixed and cannot be adapted to suit varying geometric configurations.

The compactness of the motion systems, herein presented by way of example, enables components of the system to be desirably packaged on a single base as illustrated with reference to FIGS. 17A-17G for an amusement ride employing a 3-axis, as above described by way of example. The more demanding flight simulation systems can effectively use the 6-axis systems herein described with the improved washout filter 240.

The load carrying capability of the systems herein described by way of example goes beyond what is currently possible with known electrical motion systems, and goes beyond the largest known hydraulic system. The performance of the systems herein described goes beyond what is possible with current leading edge electrical systems which are of the ball-screw type limited in fidelity by the mechanical configuration.

By way of further example, profile generating software operable with the processor 202 has each Degree of Freedom for a motion created as a separate Motion Channel (or track). Theses may be recorded in real time via a joystick, or mouse device input. This method differs from traditional methods of recording the motion with a joystick and allows editing of the motion through an adaption of actuator positions. The controller 200, 300 directly adapts the heave, pitch and roll characteristics.

By way of further example, amusement ride film may be displayed within the profile generator software application which enables a desirable accuracy and an accurate development of the ride profile. Real time recording for each channel is implicitly synchronized to each frame of the movie, so that each point in the motion profile matches the ride film perfectly (literally frame by frame). Typically, the approach is to synchronize using a time line (SMTP) which can drift. Each Recorded Motion Channel is displayed as a waveform within a scaled display, and can be viewed at different resolutions. This enables the ride profile to be modified frame by frame. This is an improvement over prior methods where the whole profile has to be re-done if any changes to a motion profile are required which typically is time consuming and expensive for known systems.

A simulation profile can be adjusted through phase shift, and/or amplitude and frequency modifications. One of the features of the controller is that a motion profile can be changed free hand by a developer with mouse using Drag and Drop techniques. An inverse kinematic algorithm is built in (off-line real time transformation of heave, pitch and roll converting back to absolute radial movements of the motors—includes complex time domain filtering to represent the real world). Position and acceleration limits are built in with real time methodology.

A joystick sensitivity algorithm is built in, which can simulate different vehicle/platform properties (e.g. various aircraft types; helicopter types; land vehicles types).

With reference again to FIGS. 18A, 18B and 19A, 19B, special effects algorithms are embedded within the controllers 200, 300, herein described for use with six and three degree of freedom motion systems, by way of non-limiting example. A motions effects library 256 may be dedicated to each actuator 16a, 16b, 16c, by way of example for a 3 DOF system, as illustrated with reference to FIG. 17A, or may be employed as a single library communicating with a motion planner 234, as illustrated with referee to FIG. 18B. This significantly improves control and enables a nesting, (also known as a combining or stacking) of effects in real time. Motion effects are superimposed real time onto the motion profile with frame by frame synchronization. Therefore effects can also be controlled with frame rate accuracy. Frequency and amplitude are fully adjustable at any location in the profile. Multiple effects can be nested (stacked) without loss of profile position (i.e. there is no drifting over time) or net effect in relation to a main motion profile. Easily created and edited software tools are provided to make it user friendly and avoid the need to make changes at source code level which can only be done by a specialist.

As above described, multiple synchronization cams or algorithms are embedded within the controller 200, 300 to allow a desirable synchronization of special motion effects (vibrations) and external events (wind, scent, water, etc.). Each synchronization track can be set at any multiple of the frame rate. This system includes passive and active control. This is an improvement over the traditional systems that are time code based which can drift over time. The synchronization tracks can be nested and started from an external signal, other tracks, or internal controller generated events, by way of example. As a result, absolute synchronization based on the position of the motors/actuators results. The traditional approach was to synchronize through a series of time coded triggers. By way of example in the amusement industry, the traditional methods resulted in problems of motion and film synchronization which often needed to be reset one or more times per day. Otherwise the mismatch has serious potential to trigger motion sickness.

By way of example with reference again to the 3 DOF system of FIGS. 18A, 18B, each pair of motors 32 is synchronized in a position mode. Typical systems were configured with one motor controlled by position and the second motor controlled through torque matching (or current following). As a result of the teachings of the present invention, embodiments of the present invention provide an absolute positioning of the synchronized motors. By way of contrast, typical torque matching techniques (or current following methods) do not take into account variations in production within and between the motor/gearbox assemblies. The motors can be controlled to synchronize their position on an absolute position of rotation. For example, if motor pairs are used, the two motors can be controlled to adjust one motor to match the position of the other motor. With reference again to the embodiment of FIG. 11, by way of example, each actuator 16D has the motors 32 in a motor pair running in opposite directions. This applies to any multi axis system using dual motor/gearbox assemblies or combinations of dual motor/gearbox assemblies. Synchronization is achieved via multiple virtual axes and electronic gearing, with an internal correction loop within a drive loop closure 264. This enables the nesting of effects described above.

The ability to synchronize the motor pairs within the actuator 16D allows for the systems 10, 100 to handle higher payloads. The system 10 can handle payloads of at least 20 tonnes for 6-axis systems employing a single motor per actuator, and at least one and one half times this payload when employing motor pairs, by way of example.

It should be noted that while each actuator can run with one pair or two pairs of motor/gearbox assemblies, systems can also operate with a single motor/gearbox assembly. The number and configuration of the motor/gearbox assemblies is primarily determined by the load, moments of inertia and acceleration requirements.

By way of example for the controllers 200, 300 herein described by way of example with reference to FIGS. 18A, 18B and 19A, 19B, a motion profile is run as "Interpolated Cam Segments" with constant position monitoring. This approach, with milliseconds updating, increases positional accuracy and maximizes ride smoothness. Master cam timing can be adjusted as required. The controllers include filtering to enable the ride profile to be managed and/or modified dynamically (on-the-fly). A cam profile from a cam profile generator 262 is linked only to virtual (multiple) axes, as illustrated with reference to FIGS. 18A, 18B and 19A, 19B. Further, interpolation in the integral drive loop closure 266 is achieved within a microsecond range while providing a smoothness of motion especially when including washout motion which has not been achieved in the art. A capability of multiple correction cams to adjust master profile as required facilitates real time adjustments.

The embodiments of the systems herein described operate with reduced power consumption as it can operate as a regenerative power system. This is enabled by the use of servos connected to a common DC Bus which is fed via the DC Regenerative Power Supplies and reactors. The regenerative power works by using decelerating drives feeding power to accelerating drives, hence reducing overall power intake. The system regenerates power throughout the whole ride cycle whenever a drive is in a decelerating mode, regardless of whether it is going up or down. This new teaching minimizes the overall power consumption. During motion where net deceleration is greater than net accelerations plus losses, energy may be shared with other actuators cooperating therewith, or stored locally in a capacitor arrangement or returned to the grid (utility supply) at the correct phase, voltage and frequency. This approach has eliminated the need for breaking resistors and all excess energy can be returned to the grid (utility supply). This results in the minimal use of power. Power consumption has been found to be less than one half the power consumption of a traditional ball-screw system with a counterbalance which may be pneumatic, less than ⅓ of the power consumption of the ball-screw system without a counter balance system, and less than 15% of the power of an equivalent hydraulic system, thus about an 85% power savings when compared to an equivalent hydraulic system.

By way of supporting example, embodiments of the invention including a 6-axis motion system have been designed, engineered, built and tested, including a proof of concept development with a 200 kg (454 lb.) payload and a pre-production system of 2 tonne (4,410 lb.) payload system. The 6-axis motion system stems from a 3-axis motion system which was developed in 2010/2011 for payloads up to 9 tonnes (19,850 lb.). Further, a 26,460 lb. (12 tonne) 3-axis system has been designed and engineered for the amusement industry and a 33,075 lb. (15 tonne) 6-axis system has been designed and engineered to meet stringent flight simulation requirements. The simulation system includes a cam mechanism.

Improvements and benefits over existing traditional hexapod electric ball-screw motion systems include the configuration of the cam mechanism, especially when coupled with high end servo-motors, drives and planetary gearboxes, results in zero mechanical backlash as planet gears remain in contact with the output shaft teeth throughout the full range of motion. By way of example, the system can be readily configured to a different configuration within a few hours by replacing cranks and connector rods with those of differing lengths to suit various aircraft platforms (within physical constraints). This will also allow the same motors and gearboxes to provide a greater range of excursions when coupled to a smaller cabin of a flight simulator. The classic Hexapod system has no such configuration flexibility and a separate motion system is required for each platform type. The configuration is not constrained to current load carrying and acceleration performance of the existing Hexapod systems.

A 24 tonne payload 3-axis motion system is currently being developed according to the teachings of the present invention for the leisure industry. A 9 tonne payload 3-axis motion system and a 2 tonne 6-axis motion system are currently being tested.

Additional benefits and features include improved Inverse Kinematic Algorithm within real time "Motion Control Software" hosted in a Windows 7 Environment with a Washout Algorithm where appropriate to convert from positions in each of the six degrees of freedom into absolute radial servo motor positions. Position and acceleration limits are integrated into the motion control software. Multiple effects can be nested (stacked) to ensure no loss of position over time when effects are superimposed.

A user friendly suite of software tools enables program parameters to be changed without the need for a specialist programmer to make changes at source code level. A desirable motor synchronization is provided when double motors or quad motors are required to meet payload load and performance specifications. Synchronization is achieved through the use of virtual axes, electronic gearing and real time internal correction loops running at 1 millisecond intervals, by way of example.

Full regenerative energy capability can be included so that any decelerating actuator works in a fully regenerative mode. This provides typical powers which are in the region of one-third of a non-counterbalanced ball-screw system and one-half of a pneumatically counterbalanced ball-screw system. The reduction in thermal loading significantly extends the life of all electrical and electronic components minimizing maintenance costs and maximizing availability. The system also has the optional ability to return excess power to the utility grid when internal regeneration exceeds system needs. This is not possible with hydraulic and ball-screw type drive systems.

The system uses an industrialized sophisticated motion controller and high quality servo drives to generate and control complex motion profiles. The motion controller receives data from the Motion PC via User Datagram Protocol (UDP). After processing, the data is sent to the servo drives using a 1 msec Loop Closure (Data Send and Receive rate) while the internal drive loop closure is within the microsecond range. High Data update rates coupled with advanced "Real Time, Dynamically Responsive" motion control algorithms allows the creation of desirably smooth and accurate simulator motion beyond that provided by known motion simulator systems.

Motion effect algorithms allow complex vibrations to be superimposed onto the motion (directly imparted through the drive system) up to the saturation level of the whole system. Vibrational frequencies exceeding 100 Hz are achieved. Resonant frequencies can easily be identified and avoided. In contrast, electric ball-screw and hydraulic systems have limited vibrational capabilities in the region of 30-35 Hz. In addition, a secondary vibration system has to be installed where higher frequencies are required.

One desirable characteristic of the motion systems herein presented includes mass and center of mass determinations during operation of the system. By way of example, when the system moves to the neutral position in the amusement industry applications, the system is able to measure the motor torques and currents of each motor. Through triangulation the mass and the center of mass of the system can be determined. This information may then be used so that, regardless of a variable guest mass and a distribution of the variable guest mass, a ride acceleration profile can be adjusted instantaneously so that the guests always experience and feel the same motion, and hence the same ride experience regardless of the guest mass and guest mass distribution. This mechanism may also be used in any type of simulator to ensure that the guest experience is identical regardless of the mass of the guest in each vehicle.

Further, it will be understood by those of skill in the art that flowcharts and block diagrams herein described may illustrate architecture, functionality, and operation of possible implementations of systems, methods and computer program products according to various embodiments. Therefore, it will be understood that each block in the flowchart or block diagram may represent a module, segment, or portion of code, which comprises one or more executable computer program instructions for implementing the specified logical function or functions. Further, some implementations may include the functions in the blocks occurring out of the order as herein presented. By way of non-limiting example, two blocks shown in succession may be executed substantially concurrently, or the blocks may at times be executed in the reverse order, depending upon the functionality involved. It will also be noted that each block of the block diagrams and flowcharts, and combinations of blocks in the block diagram and flowchart illustrations, may be implemented by special purpose hardware-based systems that perform the specified functions or acts, or combinations of special purpose hardware and computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram. These computer program instructions may also be stored in a computer readable medium that may direct a computer, other programmable data processing apparatus, or other devices to function in a particular manner, such that the instructions stored in the computer readable medium produce an article of manufacture including instructions which implement the function or act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Aspects of various embodiments as herein presented, by way of example, may be embodied as a system, method or computer program product, and accordingly may take the form of a hardware embodiment, a software embodiment (including firmware, resident software, micro-code, and the like) or a combination thereof that may generally be referred to as a circuit, module or system. Furthermore, aspects of various embodiments may take the form of a computer program product embodied in one or more computer readable media having computer readable program code embodied thereon.

It is understood that a computer implemented method as may herein be described operates with readable media relating to non-transitory media, wherein the non-transitory computer-readable media comprise all computer-readable media, with the sole exception being a transitory, propagating signal.

Any combination of one or more computer readable media may be utilized. A computer readable medium may be a computer readable signal medium or a computer readable storage medium. A computer readable storage medium may be, by way of non-limiting example, an electronic, magnetic, optical, electromagnetic, infrared, or semiconductor system, apparatus, or device, or any suitable combination of the foregoing. More specific non-limiting examples of the computer readable storage medium may include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, by way of non-limiting example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, and the like, or any suitable combination thereof. Computer program code for carrying out operations for aspects of various embodiments may be written in any combination of one or more programming languages, including an object oriented programming language such as Java, Smalltalk, C++ or the like and conventional procedural programming languages, such as the C programming language or similar programming languages. The program code may also be written in a specialized language. The program code may execute entirely on the user's computer, partly on the user's computer, as a stand-alone software package, partly on the user's computer and partly on a remote computer, or entirely on the remote computer or server. The remote computer may be connected to the user's computer through any type of network, including a local area network (LAN) or a wide area network (WAN), or the connection may be made to an external computer, by way of non-limiting example, through the Internet using an Internet Service Provider.

Although the invention has been described relative to various selected embodiments herein presented by way of example, there are numerous variations and modifications that will be readily apparent to those skilled in the art in light of the above teachings. It is therefore to be understood that, within the scope of the claims hereto attached and supported by this specification, the invention may be practiced other than as specifically described.

That which is claimed is:

1. A motion simulation system comprising:
   a platform;
   a plurality of actuators mechanically attached to the platform, wherein each actuator comprises a motor/gearbox assembly having a servomotor operable with a planetary gearbox and shaft driven thereby, and wherein rotation of the shaft results in a motion to the platform;
   a controller operable with each of the plurality of actuators, the controller controlling motion of the shaft, and thus the motion of the platform, the controller comprising:
   a profile generator providing motion and effects profiles for simulation thereof;
   a motion controller operable with the profile generator for providing a virtual motion representative of a real motion for simulation thereof;
   an electronic gearing module operable with the motion controller for converting virtual profiles to real profiles for directing the rotation of each shaft to thus provide the motion to the platform according to a preselected profile provided by the profile generator; and
   an effects controller operable with the profile generator for providing a virtual effect representative of a real effect for simulation thereof and independent of the profile provided by the motion controller; and
   a motion planner operable with the motion controller and the effects controller for transmitting a combination of motion and effects to the actuators, wherein each actuator is operable for generating power during decelerating rotational movements of the shaft for use during accelerating rotational movements thereof.

2. The motion simulation system according to claim 1, further comprising a utility supplier operable with the controller, wherein a net deceleration greater than a net acceleration plus operational losses transfers energy to the utility supplier at selected phase, voltage and frequency values of the servomotor, thus optimizing power consumption provided by the utility supplier.

* * * * *